(12) United States Patent
Yates et al.

(10) Patent No.: US 8,855,427 B2
(45) Date of Patent: Oct. 7, 2014

(54) SYSTEMS AND METHODS FOR EFFICIENTLY AND ACCURATELY DETECTING CHANGES IN SPATIAL FEATURE DATA

(75) Inventors: J. Harlan Yates, Melbourne, FL (US); Michael McGonagle, Melbourne, FL (US); Robert Haden, Rockledge, FL (US); Mark Rahmes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 376 days.

(21) Appl. No.: 13/328,031

(22) Filed: Dec. 16, 2011

(65) Prior Publication Data

US 2013/0156307 A1  Jun. 20, 2013

(51) Int. Cl.
*G06K 9/46* (2006.01)
(52) U.S. Cl.
USPC .......................................................... 382/195
(58) Field of Classification Search
None
See application file for complete search history.

(56) References Cited

U.S. PATENT DOCUMENTS

| | | | |
|---|---|---|---|
| 6,476,829 B1 | 11/2002 | Smith et al. | |
| 6,720,965 B1 | 4/2004 | Hirosawa et al. | |
| 6,970,183 B1* | 11/2005 | Monroe | 348/143 |
| 7,555,725 B2 | 6/2009 | Abramson et al. | |
| 8,341,548 B2 | 12/2012 | Ernst et al. | |
| 8,484,223 B2 | 7/2013 | Ota | |
| 2002/0033837 A1 | 3/2002 | Munro | |
| 2004/0218099 A1* | 11/2004 | Washington | 348/571 |
| 2005/0025357 A1* | 2/2005 | Landwehr et al. | 382/170 |
| 2005/0047656 A1* | 3/2005 | Luo et al. | 382/167 |
| 2005/0075544 A1 | 4/2005 | Shapiro et al. | |
| 2005/0094898 A1* | 5/2005 | Xu et al. | 382/294 |
| 2005/0249434 A1* | 11/2005 | Xu et al. | 382/294 |
| 2005/0289109 A1 | 12/2005 | Arrouye et al. | |
| 2006/0156254 A1 | 7/2006 | Satake | |
| 2006/0200760 A1 | 9/2006 | Sellers et al. | |
| 2006/0222205 A1* | 10/2006 | Porikli et al. | 382/103 |
| 2007/0092110 A1* | 4/2007 | Xu et al. | 382/103 |
| 2008/0147366 A1 | 6/2008 | Schutz et al. | |
| 2009/0076963 A1 | 3/2009 | Worthington | |
| 2009/0138817 A1 | 5/2009 | Oron et al. | |
| 2009/0214084 A1 | 8/2009 | Asner | |
| 2009/0241043 A9 | 9/2009 | Balthaser | |
| 2010/0021012 A1 | 1/2010 | Seegers et al. | |
| 2010/0070523 A1 | 3/2010 | Delgo et al. | |
| 2010/0092045 A1* | 4/2010 | Zimmer et al. | 382/113 |
| 2010/0098342 A1* | 4/2010 | Davis et al. | 382/220 |

(Continued)

OTHER PUBLICATIONS

Changing the way your search results look—eBay, Oct. 1, 2009.
Deng, J. et al, what does classifying more than 10,000 image categories tell us? Proceedings of the 12th European Conference of Computer Vision (ECCV). 2010. BibTex.

(Continued)

*Primary Examiner* — Sean Motsinger
(74) *Attorney, Agent, or Firm* — Fox Rothschild LLP; Robert J. Sacco, Esq.

(57) ABSTRACT

Systems (100) and methods (300) for efficiently and accurately detecting changes in feature data. The methods generally involve: determining first vectors for first features extracted from a first image using pixel information associated therewith; comparing the first vectors with second vectors defined by spatial feature data; classifying the first features into a plurality of classes based on the results of the vector comparisons; and analyzing the first image to determine if any one of the first features of at least one of the plurality of classes indicates that a relevant change has occurred in relation to an object represented thereby.

20 Claims, 18 Drawing Sheets

(56) References Cited

U.S. PATENT DOCUMENTS

| | | |
|---|---|---|
| 2010/0100835 A1 | 4/2010 | Klaric et al. |
| 2010/0111411 A1 | 5/2010 | Ernst et al. |
| 2010/0306665 A1 | 12/2010 | Milic-Frayling et al. |
| 2011/0173576 A1 | 7/2011 | Murphy et al. |
| 2011/0235858 A1 | 9/2011 | Hanson et al. |
| 2012/0254804 A1 | 10/2012 | Sheha et al. |
| 2012/0316782 A1 | 12/2012 | Sartipi et al. |
| 2013/0120438 A1 | 5/2013 | Shechtman et al. |
| 2013/0124951 A1 | 5/2013 | Shechtman et al. |

OTHER PUBLICATIONS

Russakovsky, O., et al, Attribute Learning in Large-scale Datasets. Proceedings of the 12th European Conference of Computer Vision (ECCV), 1st International Workshop on Parts and Attributes. 2010.

Deng, J., et al, ImageNet: A Large-scale Hierarchical Image Database. IEEE Computer Vision and Pattern Recognition (CVPR), 2009.

Deng, J., et al, Construction and Analysis of a Large Scale Image Ontology. In Vision Sciences Society (VSS), 2009.

Information about Related Patents and Patent Applications.

\* cited by examiner

SYSTEMS AND METHODS FOR EFFICIENTLY AND ACCURATELY DETECTING CHANGES IN SPATIAL FEATURE DATA

BACKGROUND OF THE INVENTION

1. Statement of the Technical Field

The invention concerns computing systems. More particularly, the invention concerns computing systems and methods for efficiently and accurately detecting changes in feature data.

2. Description of the Related Art

Imagery data is analyzed for a variety of reasons, such as for surveillance purposes, quality control purposes and/or change detection purposes. The analysis often involves manually analyzing the imagery data over an area of interest. Such manual analysis is often achieved using a computer executing image analysis software (e.g., ESRI® ArcMap® geospatial information system software, SOCET SET® software, FALCONVIEW® software, ADOBE® PHOTOSHOP® software, computer aided design software, and computer aided manufacturing software). In this scenario, only a portion of a high resolution image is displayed to an operator at any given time. As such, the software provides a pan function and a zoom function. The pan function allows the operator to change a viewport from one part of an image to another part of the image. The zoom function allows the operator to change from a distant view of an image to a more close-up view (zoom in) of the image, and vice versa (zoom out). The pan and zoom operations are typically enabled by the operator using a computer mouse, joy stick and/or gestures.

During the image analysis process, two images of the same scene, taken at different times, can be compared to detect changes in the scene. The changes are detected via a partially automated process or a manual process. In the partially automated process, the contents of a new image are automatically compared to the contents of an old image for purposes of detecting changes in features thereof. Notably, the partially automated process typically results in a relatively large number of false positives. False positives are defined as instances when the partially automated process indicates the presence of a change, but no change actually exists. Therefore, an operator often has to review the results of the automated process to identify and eliminate the false positives. The operator also reviews the results of the automated process to determine whether the change is relevant (e.g., whether a building has been destroyed, replaced or simply expanded). If the change is not relevant, then the automated result is discarded or ignored.

In the manual process, the contents of a new image are manually compared to the contents of an old image for purposes of detecting changes of features therein. More specifically, the manual process involves manually inspecting the area of interest by: (a) obtaining feature data specifying locations and characteristics of a plurality of objects (e.g., gas stations); (b) "panning" to an area of interest within the new image and the old image that is supposed to include a visual representation of at least one of the objects; (c) "zooming in" to obtain a close-up view of the area of interest within the new image and the old image; (d) visually comparing the contents of the new image to the contents of the old image to determine if the object is still present in the area of interest and/or has the characteristics defined by the feature data; and (e) repeating steps (a)-(d) for each of the objects indentified by the feature data. Notably, one or more "panning" and/or "zooming" operations may need to be performed to obtain a desired view of the area of interest. Such a manual inspection is time consuming, costly and subject to human error. Also, such a manual process results in numerous false positives as a result of the change in the sun's angle through out a day, seasonal weather changes and vegetation changes.

SUMMARY OF THE INVENTION

Embodiments of the present invention concern implementing systems and methods for efficiently and accurately detecting changes in feature data. The methods generally involve: determining first vectors for first features extracted from a first image; comparing the first vectors with second vectors defined by spatial feature data; classifying the first features into a plurality of classes based on the results of the vector comparisons; and analyzing the first image to determine if any one of the first features of at least one of the plurality of classes indicates that a relevant change has occurred in relation to an object represented thereby.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
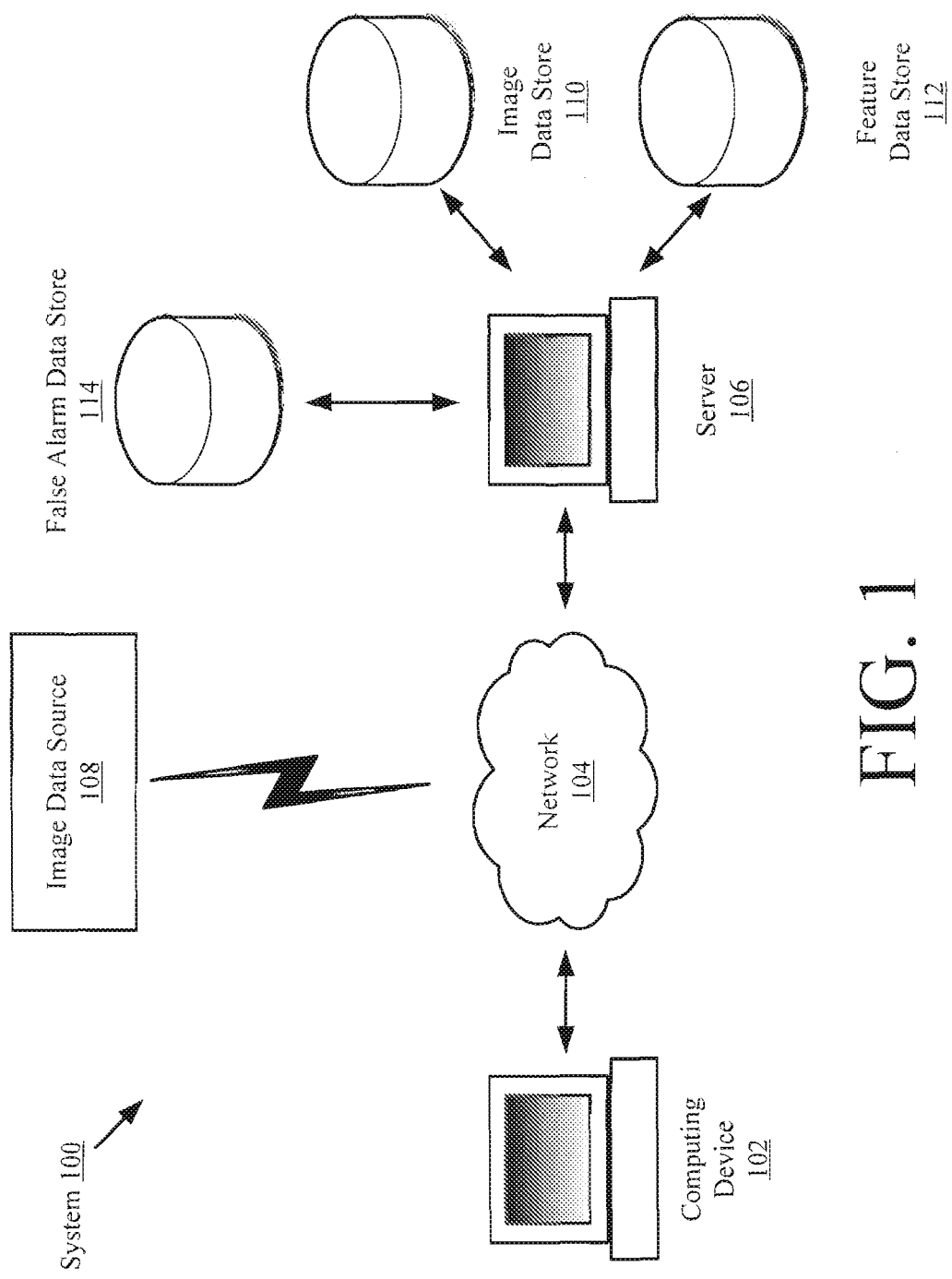
FIG. 1 is a schematic illustration of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for efficiently and accurately detecting changes in spatial feature data. In this regard, the present invention implements data driven pan operations, data driven zoom operations, and parallel pan/zoom operations for facilitating the simultaneous visual inspection of numerous areas of interest of an image. Certain embodiments of the present invention also implement novel feature detection/extraction operations and color difference image generation operations. The listed operations will become more evident as the discussion progresses. Still, it should be understood that the present invention overcomes various drawbacks of conventional spatial feature data analysis techniques, such as those described above in the background section of this document. For example, the present invention provides more efficient, less time consuming and less costly data analysis processes as compared to those of conventional data analysis techniques.

The present invention can be used in a variety of applications. Such applications include, but are not limited to, imagery applications, sensor applications, mapping applications, biometric applications (e.g., fingerprint applications), video applications, geospatial information based applications, medical applications, military applications, photograph applications, graphing applications, charting applications and any other application in which spatial feature data needs to be analyzed. Exemplary implementing system embodiments of the present invention will be described below in relation to FIGS. 1, 2, 5, 7, 8 and 16. Exemplary method embodiments of the present invention will be described below in relation to FIGS. 3A-23.

Exemplary Systems Implementing the Present Invention

Referring now to FIG. 1, there is provided a block diagram of an exemplary system 100 that is useful for understanding the present invention. The system 100 comprises a computing device 102, a network 104, a server 106, an image data source 108, and at least one data store 110, 112, 114. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate feature data maintenance using imagery source for feature display, quality control, and change detection. As such, system 100 implements a method for efficient spatial feature data analysis in accordance with embodiments of the present invention. The method will be described in detail below in relation to FIGS. 3A-23. However, it should be understood that the method implements (a) a novel technique for feature detection/extraction, (b) a data driven approach for enabling an efficient evaluation of spatial feature data using imagery data, and/or (c) a color difference image generation approach for enabling the efficient evaluation of the spatial feature data. The phrase "imagery data", as used herein, refers to data defining an image. The image includes, but is not limited to, a two-dimensional representation of at least one object and/or a multi-dimensional representation of the spatial distributions of at least one phenomenon. For example, the image is a hand drawn map, a topographical map, a graph, a photograph, a nautical chart, a drawing, a painting, or a computer graphic.

The spatial feature data and imagery data can be stored in the same or different data stores. For example, as shown in FIG. 1, the spatial feature data is stored in a feature data store 112 and the imagery data is stored in an image data store 110. The imagery data may be any type of imagery data. The imagery data can include, but is not limited to, any spatially organized raster data or similar data (e.g., satellite imagery data, airborne imagery data, digitally rendered map data, gridded terrain data, Light Detection And Ranging ("LIDAR") data, Synthetic Aperture Radar ("SAR") data, and/or scanned data). The imagery data is collected by the image data source 108. The image data source 108 can include, but is not limited to, a satellite, an unmanned aerial vehicle ("UAV"), a plane or a vehicle. Also, the imagery data can be communicated to the data store 110 via network 104 and server 106.

The computing device 102 facilitates spatial feature data analysis. Accordingly, the computing device 102 has installed thereon an Image/Feature Analysis ("IFA") software application and at least one feature analysis plug-in. The IFA software application includes, but is not limited to, ESRI® ArcMap® GIS software, SOCET SET® software, FALCONVIEW® software, ADOBE® PHOTOSHOP® software, Computer Aided Design ("CAD") software, and/or Computer Aided Manufacturing ("CAM") software. Each of the listed IFA software applications is well known in the art, and therefore will not be described in detail herein. However, it should be understood that the IFA software applications facilitate the display of images in an application window. The IFA software applications also facilitate the panning and zooming of the displayed images.

The feature analysis plug-in is a set of software components that adds specific abilities to the IFA software application. For example, the feature analysis plug-in provides the ability to: concurrently and/or simultaneously generate a plurality of chip images using imagery data defining an image; and display all or a portion of the generated chip images in a display area of a plug-in window at the same time. The phrase "chip image", as used herein, refers to a panned and/or zoomed view of an image. A chip image may include one or more features of interest. The term "feature", as used herein, refers to a geometric representation of an object (e.g., an area polygon, a line polygon and/or a point polygon). Such objects include, but are not limited to, bridges, water towers, boats, planes, roads, lakes, buildings, gas stations, restaurants, malls, stores, vehicles, and cisterns. Notably, the chip images may be displayed in the plug-in window in a grid format or a matrix format. In the grid scenario, each cell of a grid includes one chip image. As a result of such a grid arrangement of chip images, a user can perform data analysis in a shorter period of time as compared to that needed to perform a data analysis using the conventional technique employed by the IFA software application. This conventional technique generally involves manually panning and zooming to each instance of a feature class.

Figure 2:
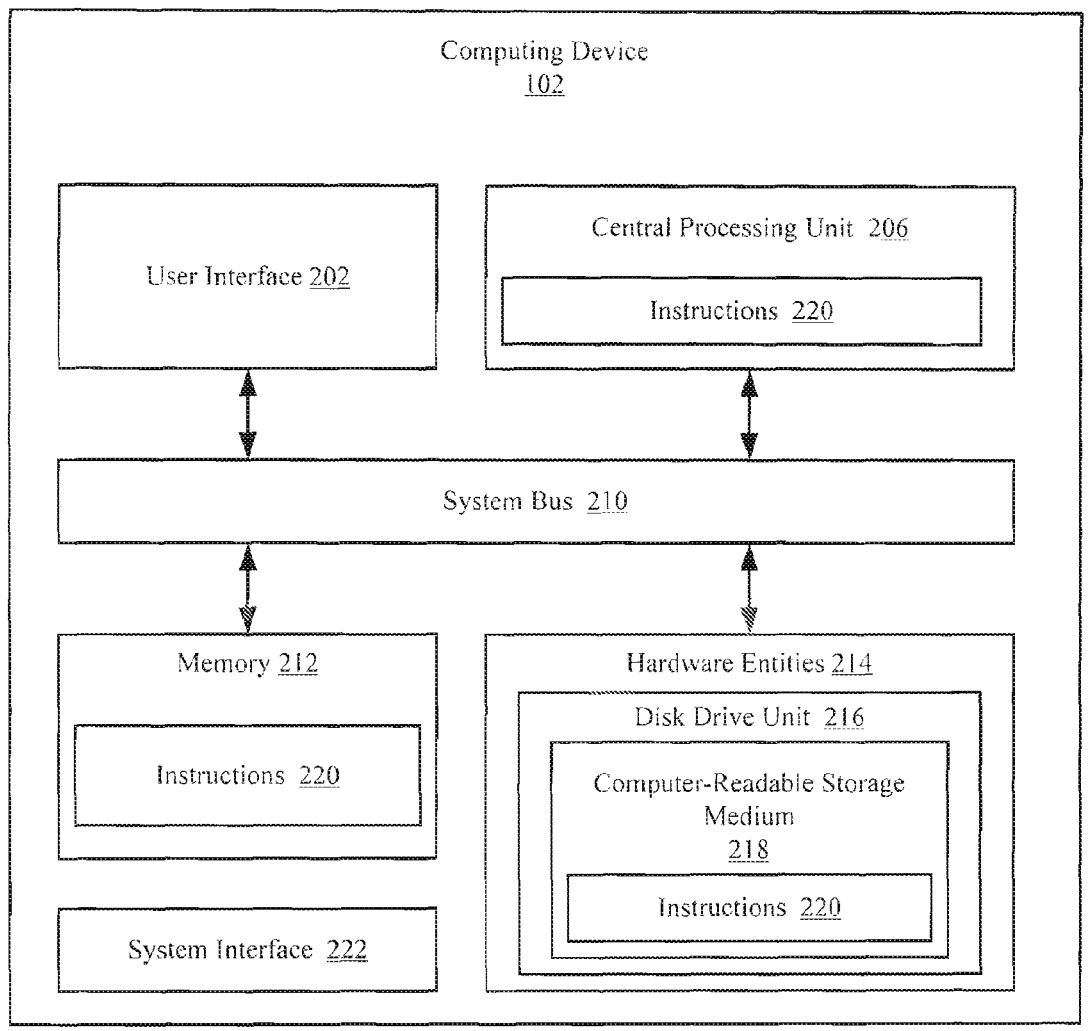
FIG. 2 is a block diagram of an exemplary computing device that is useful for understanding the present invention.

Referring now to FIG. 2, there is provided a block diagram of an exemplary embodiment of the computing device 102. The computing device 102 can include, but is not limited to, a notebook, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate spatial feature data analysis in an efficient manner. As such, the computing device 102 of FIG. 2 implements improved methods for spatial feature data analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient spatial feature data analysis through data-driven spatial sampling and data-driven spatial re-expansion of imagery data. In this regard, it should be understood that the electronic circuit can access and run IFA software applications (not shown in FIG. 2), feature analysis plug-ins (not shown in FIG. 2) and other types of applications installed on the computing device 102. The IFA software applications are generally operative to facilitate the display of images in an application window, the panning of displayed images, and the zooming of displayed images. The listed functions and other functions implemented by the IFA software applications are well known in the art, and therefore will not be described in detail herein. A schematic illustration of an exemplary application window 504 is provided in FIG. 5.

The feature analysis plug-ins are generally operative to display a plug-in window on a display screen of the computing device 102. A schematic illustration of an exemplary plug-in window 702 is provided in FIG. 7. Various types of information can be presented in the plug-in window. Such information includes, but is not limited to, chip images and feature attributes. The feature attributes can include, but are not limited to, image type (e.g., new, deleted or matched), certainty values, confidence values, heights, lengths, diameters, longitudes, latitudes, addresses, names, text and sales volumes.

The feature analysis plug-ins are also operative to perform various feature detection operations. The feature detection operations include, but are not limited to, any known feature detection operations and/or the feature detection operations described in U.S. patent application Ser. No. 13/327,952, the entire contents of which are incorporated herein by reference. As described in U.S. patent application Ser. No. 13/327,952, the feature detection operations generally include: obtaining feature information identifying portions of an image that may constitute features of the same feature class as a user-selected feature; obtaining certainty values reflecting the levels of confidence that respective identified portions of an image actually constitute features of the same feature class as a user-selected feature; comparing certainty values to one or more threshold values; discarding feature information associated with certainty values which do not exceed one or more threshold values; processing feature information to identify one or more clusters of features; determining if a total number of identified clusters of features is less than a total number of features detected divided by a parallelization factor; determining if a total number of clusters of features is less than log base two of the total number of features detected divided by a parallelization factor; enabling clustered feature data analysis processes for validating that one or more extracted features were not erroneously identified as being of the same feature class as a user-selected feature; enabling convergent grid-parallel feature data analysis processes for validating that one or more extracted features were not erroneously identified as being of the same feature class as a user-selected feature; and enabling grid-parallel feature data analysis processes for validating that one or more extracted features were not erroneously identified as being of the same feature class as a user-selected feature. The phrase "parallelization factor", as used herein, refers to a number defined by a pre-defined grid size for a grid of chip images. For example, if a grid has a size of ten cells by ten cells, then the parallelization factor is one hundred (i.e., the result of multiplying ten by ten). Similarly, if a grid has a size of three cells by four cells, then the parallelization factor is twelve (i.e., the result of multiplying three by four).

Notably, the feature information is generated using one or more feature detection/extraction algorithms. The feature detection/extraction algorithms include, but are not limited to, edge detection based algorithms, corner detection based algorithms, blob detection based algorithms, ridge detection based algorithms, and Hough transform based algorithms. Each of the listed feature detection/extraction algorithms is well known in the art, and therefore will not be described herein. The certainty values are computed using one or more certainty calculation algorithms. Certainty calculation algorithms are well known in the art, and therefore will not be described herein.

The feature analysis plug-ins are also operative to perform one or more of: computing "feature extraction" vectors for extracted features using pixel information associated therewith; and comparing the "feature extraction" vectors with "spatial feature data" vectors defined by spatial feature data. The comparison operations are performed to: (a) determine mathematically which of the extracted features overlaps one or more features defined by the spatial feature data; (b) determine which of the extracted features do not have a corresponding feature defined by the spatial feature data; and/or (c) determine which of the features defined by the spatial feature data do not have a corresponding extracted feature. Upon completing the comparison operations, the feature analysis plug-in performs operations for classifying the extracted features as "new features", "deleted features" and/or "matched features". A "new feature" is an extracted feature that does not have a corresponding feature defined by the spatial feature data. A "deleted feature" is a feature defined by the spatial feature data that does not have a corresponding extracted feature. A "matched feature" is a feature that at least partially overlaps a feature defined by the spatial feature data.

The feature analysis plug-in may also compute confidence values for the "matched features". A confidence value is a numerical value indicating the degree of similarity, difference or overlap between an extracted feature and a corresponding feature defined by spatial feature data. In some embodiments of the present invention, the confidence value is determined by comparing an area of an extracted feature with an area of a feature defined by spatial feature data. In this scenario, the confidence value includes, but is not limited to, a ratio of area sizes. In other embodiments of the present invention, the confidence value is determined by comparing how many corners of an extracted feature are common in a feature defined by spatial feature data.

Notably, relatively good confidence values can be obtained for mis-registered images because pixel information associated with an extracted feature are not compared to pixel information associated with a corresponding feature defined by spatial feature data. Rather, vectors associated with extracted features are compared to vectors associated with corresponding features defined by spatial feature data. As such, the comparison operations can involve: identifying a feature from a "new image" that has a centroid which is "N" (e.g., 30) meters from a centroid of a feature from an "old image"; and generating a confidence value using information associated with the identified feature from the "new image" and information associated with the feature from the "old image".

The feature analysis plug-ins are further operative to enable targeted change detection processes. In this regard, the feature analysis plug-ins are operative to perform one or more of: automatically and simultaneously generate a plurality of chip images in response to a user software interaction; generate at least one screen page of chip images arranged in a grid or matrix format; display screen pages of chip images in a plug-in window; update a view of an image displayed in an application window to show at least the visual contents of a selected one of a plurality of chip images displayed in a plug-in window; sort a plurality of chip images based on at least one feature attribute (e.g., certainty value, an image type and/or a confidence value); generate and display at least one screen page of chip images which are arranged in a sorted order; filter chip images based on at least one feature attribute (e.g., an image type of new, deleted and/or matched); randomly select and display only a percentage of a plurality of chip images; change a grid size in response to a user software interaction; change a zoom level of scale or resolution of displayed chip images in response to a user software interaction; pan an image displayed in an application window such that a feature of a chip image displayed in a plug-in window is shown in the application window; zoom an image displayed in an application window such that a feature of a chip image is shown at a particular zoom resolution within the application window; cycle through screen pages of chip images that were generated using a plurality of images; generate and display chip images comprising visual representations of features that are common to two or more images; mark chip images in response to user software interactions; unmark chip images in response to user software interactions; and remember various settings that a user sets for each feature class (e.g., bridges, water towers and gas stations) during at least one session. The listed functions and other functions of the feature analysis plug-ins will become more apparent as the discussion progresses. Notably, one or more of the functions of the feature analysis plug-ins can be accessed via a toolbar, menus and other Graphical User Interface ("GUI") elements of the plug-in window.

Figure 7:
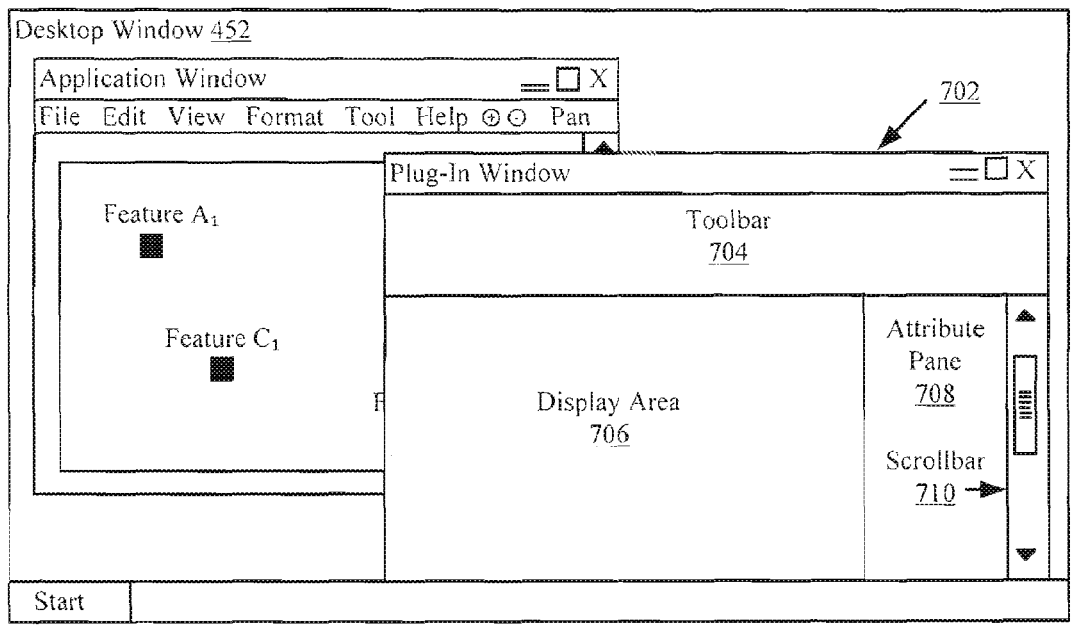
FIG. 7 is a schematic illustration of an exemplary plug-in window that is useful for understanding the present invention.
Figure 8:
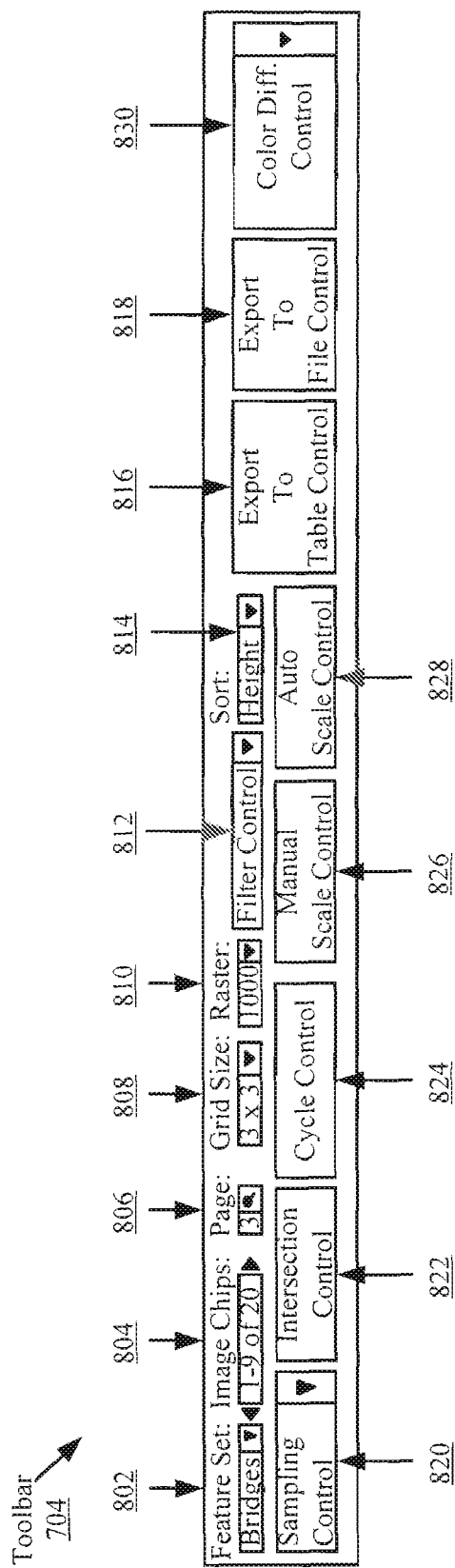
FIG. 8 is a schematic illustration of an exemplary toolbar of a plug-in window that is useful for understanding the present invention.

A schematic illustration of an exemplary toolbar 704 of a plug-in window (e.g., plug-in window 702 of FIG. 7) is provided in FIG. 8. As shown in FIG. 8, the toolbar 704 comprises a plurality of exemplary GUI widgets 802-830. Each of the GUI widgets 802-830 is shown in FIG. 8 as a particular type of GUI widget. For example, GUI widget 802 is shown as a drop down menu. Embodiments of the present invention are not limited in this regard. The GUI widgets 802-830 can be of any type selected in accordance with a particular application.

GUI widget 802 is provided to facilitate the display of an array of chip images providing visual representations of features of a user selected feature class (e.g., chimney/smokestack, gas station, restaurant, lake, road, water tower, and building). The array of chip images is displayed in the display area (e.g., display area 706 of FIG. 7) of the plug-in window (e.g., plug-in window 702 of FIG. 7) in a grid format. In the embodiment shown in FIG. 8, the GUI widget 802 includes, but is not limited to, a drop down list that is populated with the feature classes identified in a previously generated feature list. Drop down lists are well known in the art, and therefore will not be described herein.

GUI widget 804 is provided to facilitate moving through screen pages of chip images associated with a single feature class. If a selected feature class has more than the maximum number of features that can fit in a grid of a selected grid size (e.g., three cells by three cells), then the feature analysis plug-in generates a plurality of screen pages of chip images. Each screen page of chip images includes a grid with chip images contained in the cells thereof. As shown in the embodiment of FIG. 8, the GUI widget 804 includes, but is not limited to, a text box, a forward arrow button and a backward arrow button. Text boxes and arrow buttons are well known in the art, and therefore will not be described herein. This configuration of the GUI widget 804 allows a user to move forward and backward through the screen pages of chip images associated with a single image. Paging forward or backward will cause the chip image in an upper left corner grid cell of the new screen page to be selected. The screen page context is displayed in the text box as the numerical range of chip images displayed (e.g., chip images one through nine) and the total number of chip images (e.g., twenty) providing visual representations of features of a selected feature class.

GUI widget 806 is provided to facilitate jumping to a desired screen page of chip images for review. As shown in the embodiment of FIG. 8, GUI widget 806 includes, but is not limited to, a text box and a search button. The text box is a box in which to enter a screen page number (e.g., three). Clicking the search button will cause the screen page of chip images having the entered screen page number to be displayed in the display area (e.g., display area 706 of FIG. 7) of the plug-in window (e.g., plug-in window 702 of FIG. 7).

GUI widget 808 is provided to facilitate a selection of a grid size from a plurality of pre-defined grid sizes. As shown in FIG. 8, the GUI widget 808 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four chip images will be simultaneously or concurrently displayed in the display area of the plug-in window. The grid size of three cells by three cells ensures that a maximum of nine chip images will be simultaneously or concurrently displayed in the display area of the plug-in window. The grid size of four cells by four cells ensures that a maximum of sixteen chip images will be simultaneously or concurrently displayed in the display area of the plug-in window. The grid size of five cells by five cells ensures that a maximum of twenty-five chip images will be simultaneously or concurrently displayed in the display area of the plug-in window. The grid size of six cells by six cells ensures that a maximum of thirty-six chip images will be simultaneously or concurrently displayed in the display area of the plug-in window. The grid size of seven cells by seven cells ensures that a maximum of forty-nine chip images will be simultaneously or concurrently displayed in the display area of the plug-in window. The grid size of eight cells by eight cells ensures that a maximum of sixty-four chip images will be simultaneously or concurrently displayed in the display area of the plug-in window. The grid size of nine cells by nine cells ensures that a maximum of eight-one chip images will be simultaneously or concurrently displayed in the display area of the plug-in window. The grid size of ten cells by ten cells ensures that a maximum of one hundred chip images will be simultaneously or concurrently displayed in the display area of the plug-in window. Embodiments of the present invention are not limited in this regard. A grid size can alternatively be selected to define a grid having more or less rows than columns. For example, the grid size can be selected to be three cells by four cells.

Notably, the display area for each chip image is different for each grid size. For example, the display area for each chip image in a grid having a grid size of two cells by two cells is larger than the display area for each chip image in a grid having a grid size of three cells by three cells. Also, if each chip image has the same zoom level of scale or resolution, then the portion of an image contained in a chip image displayed in a two cell by two cell grid is larger than the portion of an image contained in a chip image displayed in a three cell by three cell grid. It should also be noted that, in some embodiments, a selected chip image of a first grid will reside in an upper left corner cell of a second grid having an enlarged or reduced grid size.

GUI widget 812 is provided to facilitate a selection of features for display in the display area (e.g., display area 706 of FIG. 7) of the plug-in window (e.g., plug-in window 702 of FIG. 7) based on their attributes (e.g., feature type, certainty values or confidence values). As shown in FIG. 8, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< > '100 Feet'], ["HEIGHT" IS NULL], ["HEIGHT" IS NOT NULL], ["HEIGHT"≥'100 Feet' AND "DIAMETER">'40 Feet'], or ["HEIGHT"≤'100 Feet' OR "DIAMETER">'40 Feet']). When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., bridges) to a second feature class (e.g., water towers) during a session, then the previously set filter query for the second feature class will be restored. Consequently, only features of the second feature class (e.g., water towers) which have the attribute specified in the previously set filter query (e.g., "HEIGHT"='100 Feet') will be displayed in the plug-in window.

GUI widget 814 is provided to facilitate the sorting of chip images based on one or more attributes of the features shown therein. For example, a plurality of chip images are sorted into an ascending or descending order based on the certainty values or confidence values associated with the features shown therein. As shown in FIG. 8, the GUI widget 814 includes a drop down list. Embodiments of the present invention are not limited in this regard. For example, the GUI widget 814 can alternatively include a button and a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which one or more attributes can be selected from a plurality of attributes. The drop down box may also include widgets for specifying whether the chip images should be sorted in an ascending order or a descending order.

Notably, the feature analysis plug-in remembers the sort settings that a user defines for each feature class during a session. Accordingly, if the user changes a feature class from a first feature class (e.g., bridges) to a second feature class (e.g., water towers) during a session, then the previously defined sort settings for the second feature class will be restored. Consequently, chip images showing features of the second feature class (e.g., water towers) will be displayed in a sorted order in accordance with the previously defined sort settings.

GUI widget 820 is provided to facilitate the display of a random sample of chip images of features of a particular feature class for visual inspection and quality control testing. As such, the GUI widget 820 includes, but is not limited to, a button for enabling/disabling a random sampling function of the feature analysis plug-in and a drop down menu from which a percentage value can be selected.

GUI widget 822 is provided to facilitate the filtering of features with center points which lie outside of an area (e.g., a geographical area) defined either by the area that a plurality of images have in common or by the area covered by a plurality of images taken together. As such, the GUI widget 822 includes, but is not limited to, a button for enabling and disabling an intersection function of the feature analysis plug-in.

GUI widget 810 is provided to facilitate the selection of an image from a plurality of images. As shown in FIG. 8, the GUI widget 810 includes, but is not limited to, a text box and a drop down list populated with the names of images. If a user selects a new item from the drop down list, then the feature analysis plug-in generates and displays at least one screen page of chip images using the image indentified by the newly selected item. The chip images contain visual representations of features of the same feature class as the immediately preceding displayed chip images. The text box displays information identifying the image from which the currently displayed chip images were generated. The contents of the text box can be updated in response to a user selection of a new item from the drop down list. The contents of the text box can also be updated by the feature analysis plug-in during the performance of image cycling operations, which will be described below in relation to GUI widget 824. Accordingly, the information contained in the text box always identifies the image from which the currently displayed chip images were generated.

GUI widget 824 is provided to facilitate the cycling through chip image screen pages for a plurality of images. A user may want to cycle through such chip image screen pages for change detection purposes. The GUI widget 824 is configured to allow manual cycling and/or automatic cycling between chip image screen pages for a plurality of images. As such, the GUI widget 824 includes, but is not limited to, a check box for enabling and disabling image cycling operations of the feature analysis plug-in, a slider for setting the rate at which the images automatically cycle, and/or a button for manually commanding when to change the image.

GUI widget 826 is provided to facilitate the performance of manual-scale operations by the feature analysis plug-in. The manual-scale operations are operative to adjust the zoom level of scale of all of the displayed chip images from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget 826 includes, but is not limited to, a drop down list populated with a plurality of whole number percentage values. The percentage values include, but are not limited to, whole number values between zero and one hundred.

GUI widget 828 is provided to facilitate the viewing of each displayed feature at its best-fit zoom level of scale or its pre-defined maximum zoom level of scale. As such, the GUI widget 828 includes, but is not limited to, a button for enabling and disabling auto-scale operations of the feature analysis plug-in. When the auto-scale operations are enabled, the manual-scale operations are disabled. Similarly, when the auto-scale operations are disabled, the manual-scale operations are enabled.

GUI widget 816 is provided to facilitate the writing of all "flagged" chip images to a data reviewer error table stored in a specified data store (e.g., feature data store 112 of FIG. 1). GUI widget 818 is provided to facilitate the saving of all chip images which have been "flagged" during a session to a user-named file, such as a shape file. Shape files are well known in the art, and therefore will not be described herein. In some embodiments of the present invention, a chip image is "flagged" by right clicking on the chip image to obtain access to a "chip context" GUI and selecting a "flag" item from the "chip context" GUI.

GUI widget 830 is provided to facilitate a user request for color differencing in increments. As shown in FIG. 8, GUI widget 830 includes, but is not limited to, a button for enabling/disabling a color differencing function of the feature analysis plug-in and an arrow button for accessing a submenu. The submenu includes GUI widgets for selecting a first image and a second image from which a color difference image is to be generated. These submenu GUI widgets can include, but are not limited to, text boxes and drop down menus. A schematic illustration of an exemplary "color differencing" submenu 1604 is provided in FIG. 16.

The phrase "color differencing", as used herein, refers to a computational technique which leverages the presence of a human analyst and his/her inherent biological visual system. This computational technique provides an effective way of detecting change between a set of temporally different images with overlapping registered footprints. Color differencing is accomplished by: applying the pixel intensities to the green spectrum of a Red Green Blue ("RGB") signal for a first image; applying the pixel intensities to the blue and red spectrums of an RGB signal for a second image; and overlapping the "colored" first and second images to generate a color difference image. In the color difference image, a grey pixel indicates that the values of the two corresponding pixels of the first and second images are the same. The green pixels of the color differencing image indicate that particular items are contained exclusively in the first image. The blue-red or purple pixels of the color differencing image indicate that particular items are contained exclusively in the second image. A group of different colored pixels of the color differencing image indicates a subtle change between corresponding pixels of the first and second images. The color differencing image provides a means for rapidly detecting changes between the contents of two images. The color differencing image also provides two dimensional ("2D") awareness of what has changed over a large area.

As evident from the above discussion, the system 100 implements one or more method embodiments of the present invention. The method embodiments of the present invention provide implementing systems with certain advantages over conventional data analysis systems. For example, the present invention provides a system in which an analysis of spatial data can be performed in a shorter period of time as compared to the amount of time needed to analyze spatial data using conventional pan/zoom techniques. The present invention also provides a system in which spatial data is analyzed much more efficiently than in conventional spatial data analysis systems. The manner in which the above listed advantages of the present invention are achieved will become more evident as the discussion progresses.

Exemplary Methods of the Present Invention

Figure 3A:
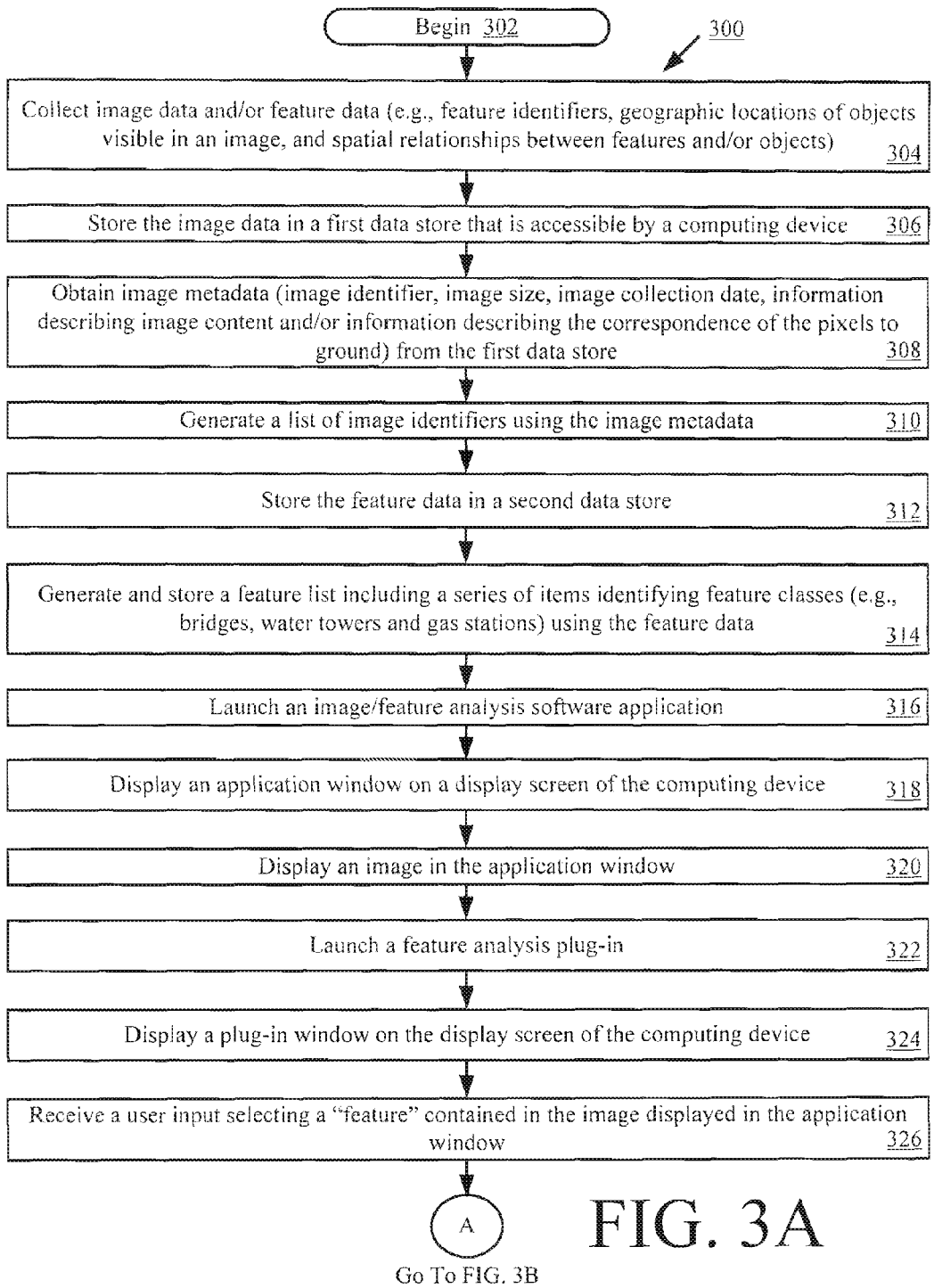
FIGS. 3A-3B collectively provide a flow diagram of an exemplary method for efficient feature data change detection that is useful for understanding the present invention.
Figure 3B:
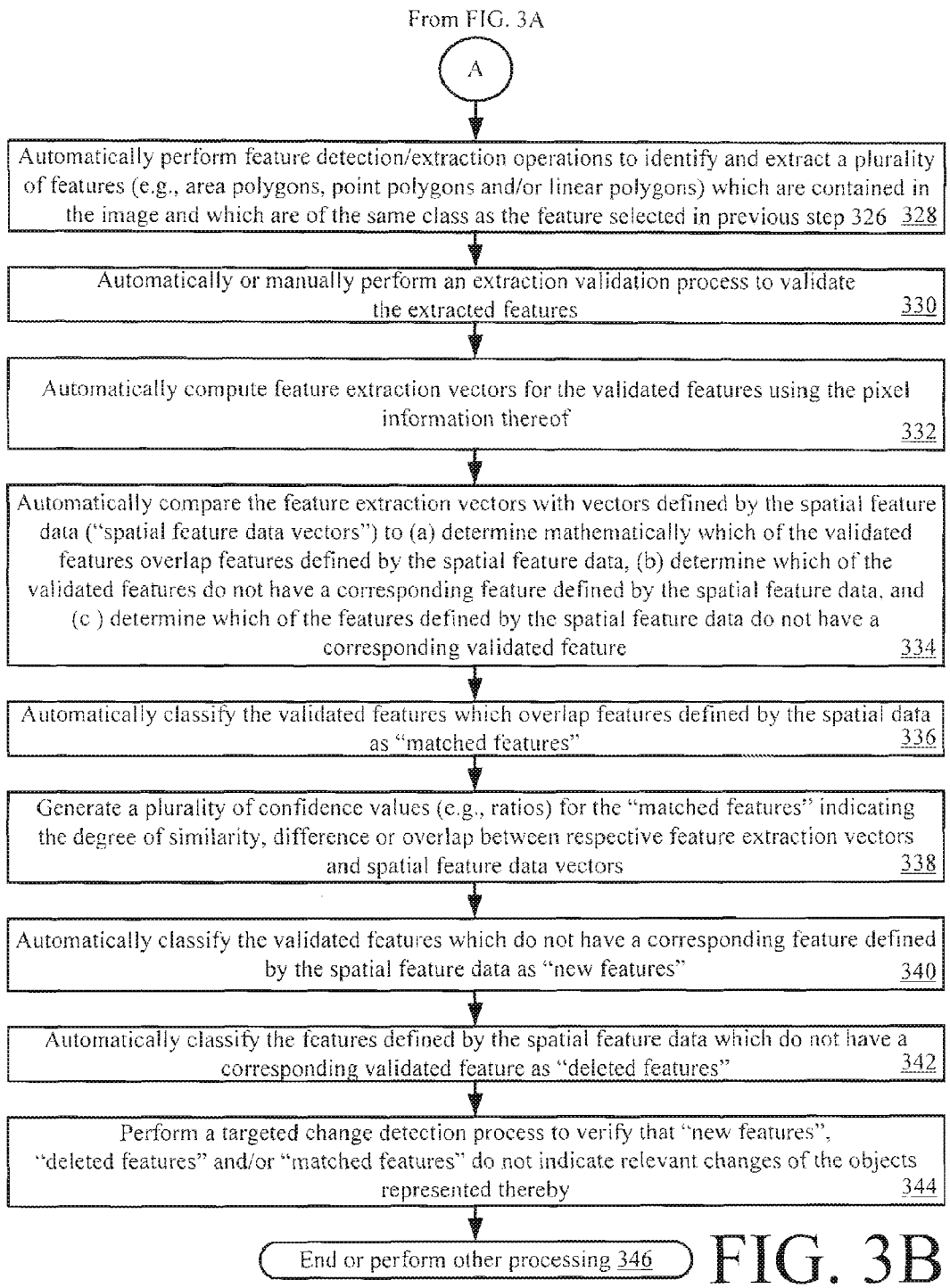

Referring now to FIGS. 3A-3B, there is provided a flow diagram of an exemplary method 300 for efficiently and accurately detecting changes in spatial feature data that is useful for understanding the present invention. As shown in FIG. 3A, method 300 begins with step 302 and continues with step 304. In step 304, image data and feature data is collected. The feature data can include, but is not limited to, data defining feature identifiers, geographic locations of objects visible in an image, and spatial relationships between features and/or objects. After the image data is collected, it is stored in a first data store (e.g., data store 110 of FIG. 1) that is accessible by a computing device (e.g., computing device 102 of FIG. 1), as shown by step 306. In a next step 308, image metadata is obtained from the first data store. The image metadata can include, but is not limited to, data defining image identifiers, image sizes, image collection dates, image content, and the correspondence of pixels to ground. The image metadata is then used in step 310 to generate a list of image identifiers. This list of image identifiers may be subsequently used by an IFA software application and/or a feature analysis plug-in to allow a user to select at least one of a plurality of images to analyze at any given time.

Similar to the image data, the feature data is stored in a data store (e.g., data store 112 of FIG. 1) after it is collected, as shown by step 312. The feature data is used in step 314 to generate a feature list including a series of items identifying feature classes (e.g., bridges, water towers and gas stations). Subsequently, the feature list is stored in the data store (e.g., data store 112 of FIG. 1).

Figure 4:
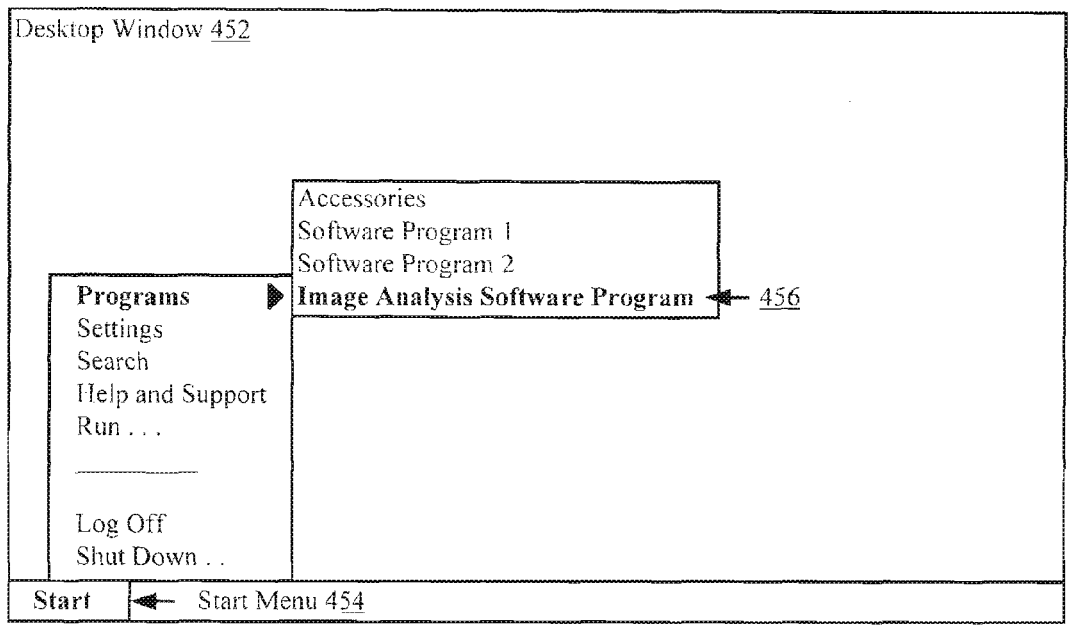
FIG. 4 is a schematic illustration of an exemplary desktop window that is useful for understanding the present invention.

Upon completing step 314, the method continues with step 316 where an IFA software application is launched. The IFA software application can be launched in response to a user software interaction. For example, as shown in FIG. 4, an IFA software application can be launched by accessing and selecting an IFA software application entry 456 on a start menu 454 of a desktop window 452.

Figure 5:
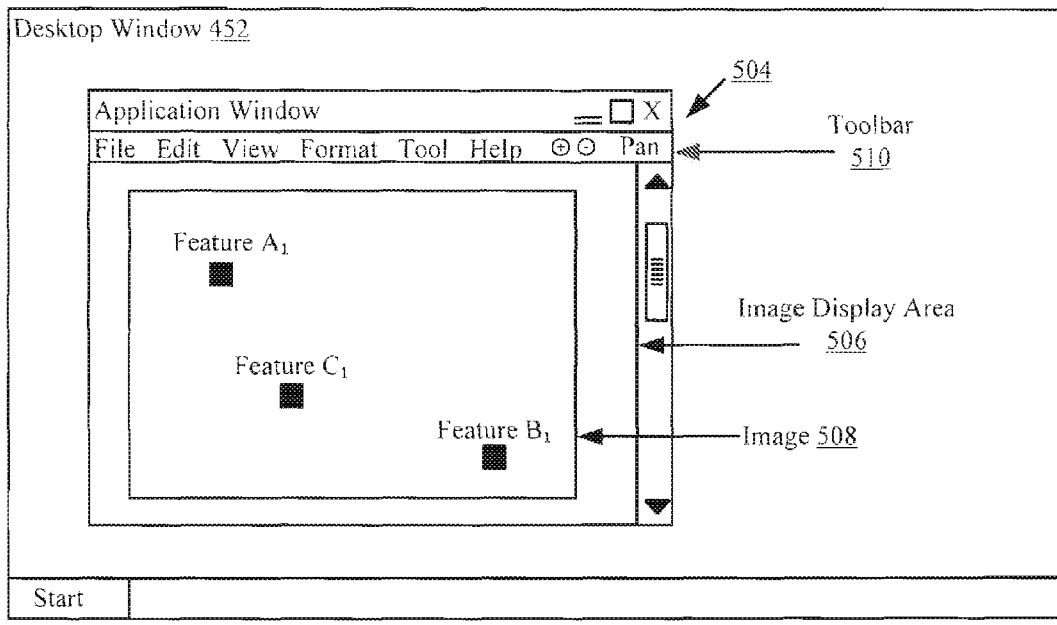
FIG. 5 is a schematic illustration of an exemplary application window that is useful for understanding the present invention.

In a next step 318, an application window is displayed on top of the desktop window. A schematic illustration of an exemplary application window is provided in FIG. 5. As shown in FIG. 5, the application window 504 includes a toolbar 510 including GUI widgets for at least displaying an image, panning an image, zooming an image, and launching a plug-in. The application window 504 also includes an image display area 506 in which an image can be presented to a user of the computing device (e.g., computing device 102 of FIG. 1).

Referring again to FIG. 3A, an image is displayed in the application window, as shown in step 320. A schematic illustration showing an exemplary image 508 displayed in an application window 504 is provided in FIG. 5. The image 508 contains a feature $A_1$ (e.g., a dot or polygon visually representing a water tower), a feature $B_1$ (e.g., a dot or polygon visually representing a bridge) and a feature $C_1$ (e.g., a dot or polygon visually representing a gas station). Each of the features may include, but is not limited to, a point, a line or a polygon providing a visual representation of an object (e.g., a water tower, a bridge or a gas station). Notably, the image can be selected by a user using a GUI widget of the application window. In this regard, the GUI widget can present the list of image identifiers generated in previous step 310 to a user of the computing device. The GUI widget can also allow the user to select an image identifier from the list of image identifiers. In response to the user-selection of an image identifier, the IFA application software displays an image identified by the selected image identifier in the application window.

Figure 6:
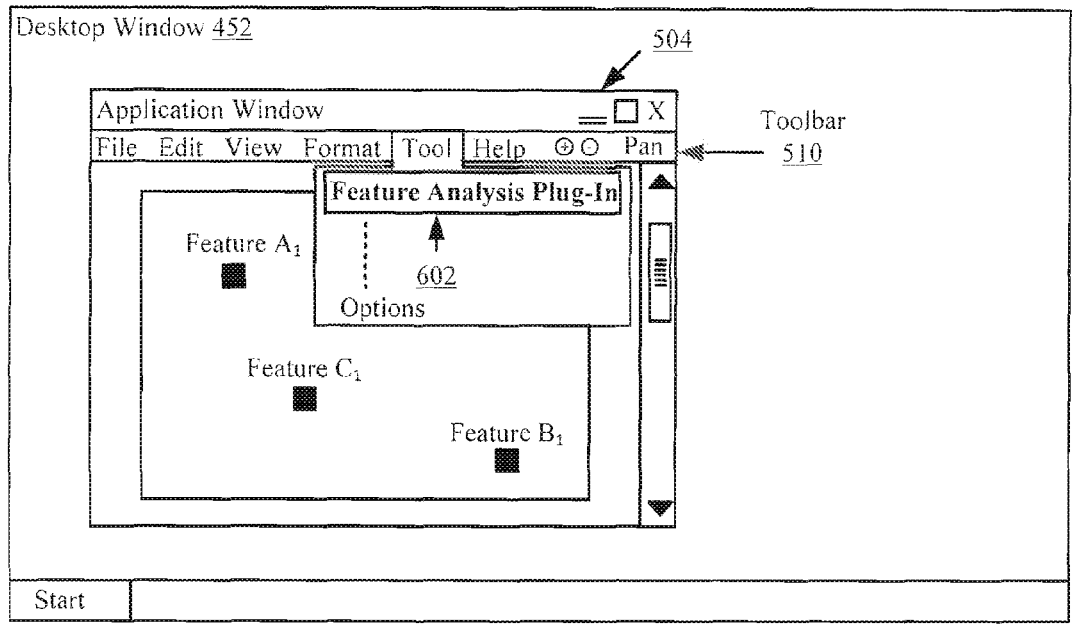
FIG. 6 is a schematic illustration of an exemplary drop down menu of an application window that is useful for understanding the present invention.

After the image is presented to a user of the computing device (e.g., computing device 102 of FIG. 1), a feature analysis plug-in is launched, as shown by step 322. The feature analysis plug-in can be launched in response to a user-software interaction. For example, as shown in FIG. 6, a feature analysis plug-in is launched by selecting an item 602 of a drop down menu of a toolbar 510 of the application window 504. Once the feature analysis plug-in is launched, step 324 is performed where a plug-in window is displayed on top of the desktop window and/or application window. A schematic illustration of an exemplary plug-in window 702 is provided in FIG. 7. As shown in FIG. 7, the plug-in window 702 comprises a toolbar 704, a display area 706, an attribute pane 708, and a scrollbar 710. The display area 706 provides an area where screen pages can be displayed. The attribute pane 708 provides an area where attribute information relating to a displayed feature or chip image can be visually presented. The scrollbar 710 allows a user to scroll continuous text representing the attribute information. A schematic illustration of the toolbar 704 is provided in FIG. 8. As shown in FIG. 8, the toolbar 704 comprises a plurality of exemplary GUI widgets 802-830. Each of the GUI widgets 802-830 is described above in detail.

Figure 9:
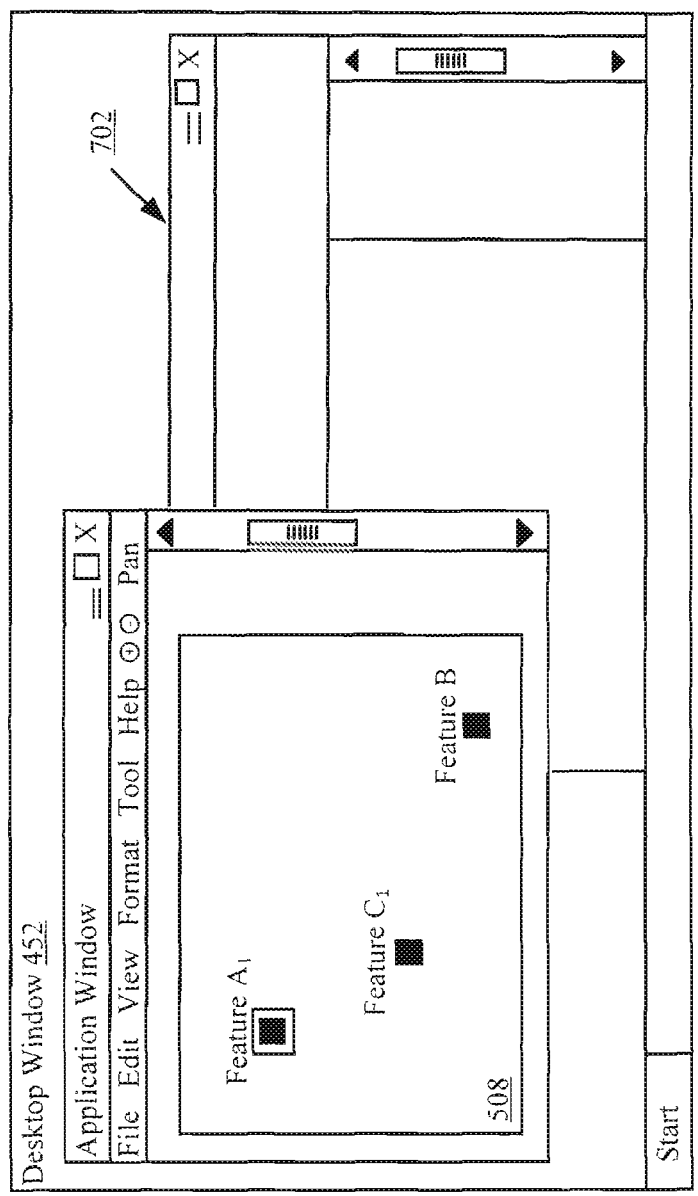
FIG. 9 is a schematic illustration of an exemplary image displayed in an application window that is useful for understanding the present invention.

Referring again to FIG. 3A, a next step 326 involves receiving a user input for selecting a first "feature" contained in the first image displayed in the application window. A schematic illustration of a selected feature $A_1$ of a displayed image 508 is shown in FIG. 9. In some embodiments, the feature $A_1$ is selected by moving a mouse cursor thereover and clicking a mouse button. As shown in FIG. 9, the selected feature $A_1$ is surrounded by a rectangle. Embodiments of the present invention are not limited in this regard. Any type of mark or annotation can be used to illustrate that a particular feature of an image has been selected.

In response to the user-software interaction of step 326, the method 300 continues with the performance of feature detection/extraction operations, as shown by steps 328-330 of FIG. 3B. Step 328 involves automatically performing feature detection/extraction operations to identify and extract a plurality of features (e.g., polygons, lines and/or points) which are contained in the image and which are the same class as the feature selected in previous step 326. The feature detection/extraction operations can include, but are not limited to, any known feature detection/extraction operations and the feature detection/extraction operations described in U.S. patent application Ser. No. 13/327,952.

In a next step 330, an automatic validation process and/or a manual validation process is performed to validate that each of the extracted features was not erroneously identified as a feature of the same feature class as the feature selected in previous step 326. The manual validation process can include, but is not limited to, any known extracted feature validation process and the validation processes described in U.S. patent application Ser. No. 13/327,952. The automated validation process can include, but is not limited to, a process which involves disregarding or assigning less value to an extracted feature that represents objects residing at certain locations of the Earth where seasonal weather changes occur or vegetation changes occur that often cause false positive errors during a feature detection/extraction process. A data store (e.g., data store 114 of FIG. 1) can be provided to facilitate the automated validation process. In this scenario, the data store comprises data identifying the locations of the Earth where seasonal weather changes occur or vegetation changes occur that often cause false positive errors during a feature detection/extraction process.

Subsequent to completing the validation process, step 332 is performed where "feature extraction" vectors are computed for the validated features using the pixel information thereof. In some embodiments of the present invention, the "feature extraction" vectors are determined by converting the pixel locations in the image to coordinates of a two dimensional (2D) or three dimensional (3D) space. In this regard, a point feature can be defined by the coordinates (x, y) or (x, y, z) for a point in the 2D or 3D space. A linear feature can be defined by the coordinates of two end points of a line in the 2D or 3D space. An area polygon feature can be defined by the coordinates of a plurality of points in the 2D or 3D space which define the boundary of the area polygon.

In a next step 334, the "feature extraction" vectors are automatically compared with vectors defined by the spatial feature data. The comparison operations of step 334 are performed to: determine mathematically which of the validated features overlap features defined by the spatial feature data; determine which of the validated features do not have a corresponding feature defined by the spatial feature data; and determine which of the features defined by the spatial feature data do not have a corresponding validated feature. Upon completing step 334, steps 336-342 are performed.

Step 336 involves automatically classifying the validated features which overlap features defined by the spatial feature data as "matched features". In a next step 338, a plurality of confidence values are generated by the feature analysis plug-in. The confidence values and methods for determining the same are described above in detail. However, it should be noted here that the confidence values indicate the degree of similarity, difference or overlap between respective "feature extraction" vectors and "spatial feature data" vectors.

Step 340 involves automatically classifying the validated features which do not have a corresponding feature defined by the spatial data as "new features". Step 342 involves automatically classifying the features defined by the spatial feature data which do not have a corresponding validated feature as "deleted features".

Once all of the validated features have been classified, step 344 is performed where one or more targeted change detection processes is performed. The targeted change detection processes are performed to verify that "new features", "deleted features", and/or "matched features" do not indicate relevant changes of the objects represented thereby. Various targeted change detection processes will be described below in relation to FIGS. 10-23. After completing the targeted change detection process or processes, step 346 is performed where the method 300 ends or other processing is performed.

Figure 10:
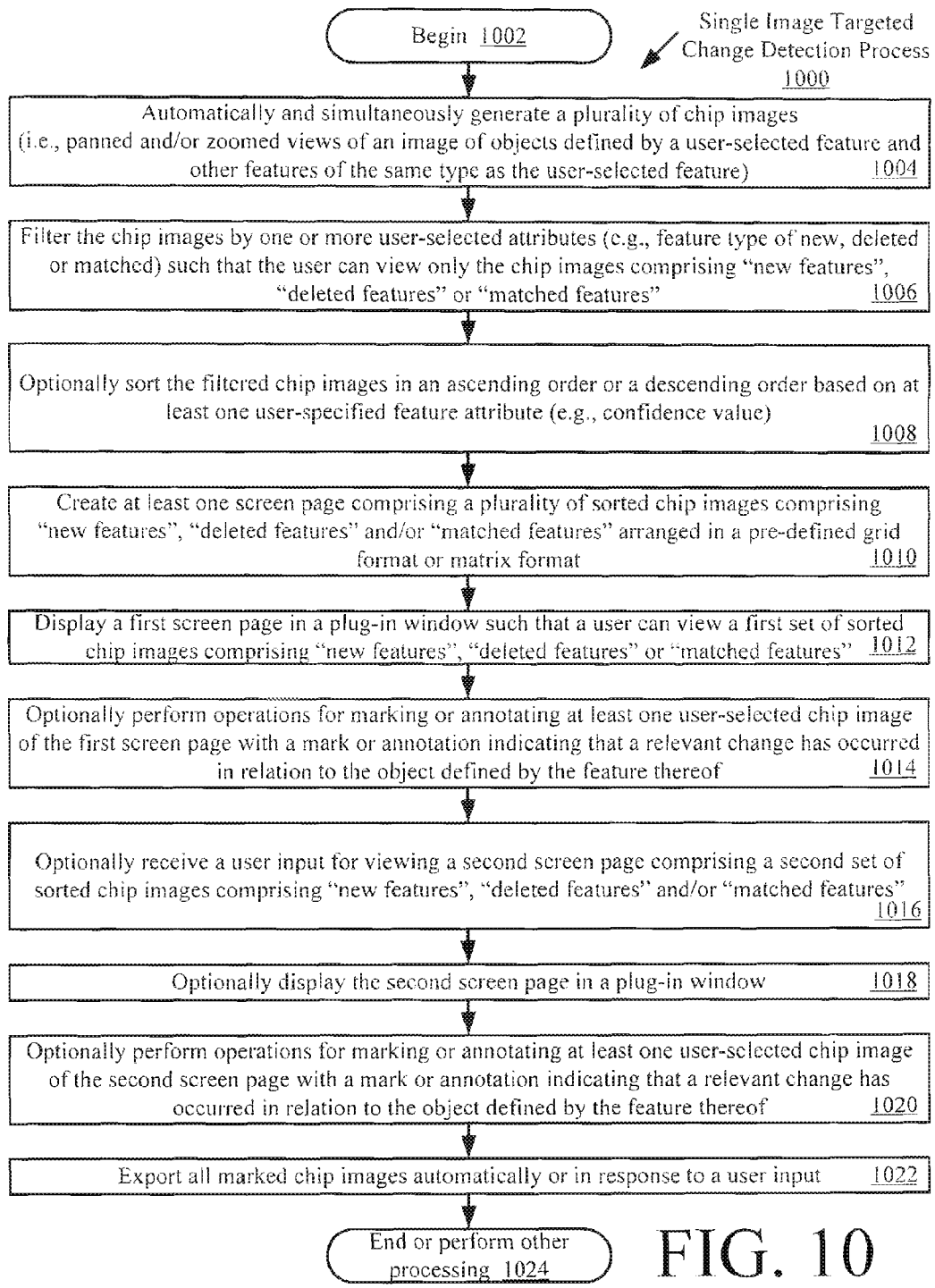
FIG. 10 is a flow diagram of an exemplary single image targeted change detection process that is useful for understanding the present invention.

Referring now to FIG. 10, there is provided a flow diagram of an exemplary single image targeted change detection process 1000 that is useful for understanding the present invention. As shown in FIG. 10, process 1000 begins with step 1002 and continues with step 1004. Step 1004 involves automatically and simultaneously generating a plurality of chip images by a computing device (e.g., computing device 102 of FIG. 1). The chip images comprise panned and/or zoomed views of an image of objects defined by a user selected feature and other features of the same type as the user-selected feature.

In a next step 1006, the computing device filters the chip images by one or more user-selected feature attributes thereof. The feature attributes can include, but are not limited to, a feature type (e.g., new, deleted or matched). In this scenario, the filtering operations are performed such that a user can view only the chip images comprising "new features", "deleted features" or "matched features". The user-software interaction for selecting a feature attribute is facilitated by a GUI widget (e.g., GUI widget 812 of FIG. 8) of the plug-in window (e.g., the plug-in window 702 of FIG. 7). The GUI widget is configured to facilitate a selection of features for display in the display area (e.g., display area 706 of FIG. 7) of the plug-in window (e.g., plug-in window 702 of FIG. 7) based on their attributes. In this regard, the GUI widget may include, but is not limited to, a "filter control" button and a "filter setting" drop down button. The "filter control" button facilitates the enablement and disablement of an attribute filter function. The "filter setting" drop down button facilitates the display of a drop-down box for assembling a query phrase defining an attribute filter (e.g., ["FEATURE TYPE"='matched']).

Upon completing step 1006, an optional step 1008 is performed. In step 1008, the computing device optionally sorts the filtered chip images in an ascending order or a descending order based on at least one user-specified feature attribute. The feature attribute can include, but is not limited to, a confidence value. The sorting operations can be performed in response to a user input. In this scenario, the user input is facilitated by a GUI widget (e.g., GUI widget 814 of FIG. 8) of the plug-in window (e.g., the plug-in window 702 of FIG. 7). The GUI widget may be configured to allow a user to specify the attribute(s) that the sorting should be based on, and/or specify whether the chip images should be sorted in an ascending order or a descending order. In response to the user input, all or a portion of the chip images are sorted by the feature analysis plug-in in an ascending order or a descending order based on the user-specified feature attribute(s).

Figure 11:
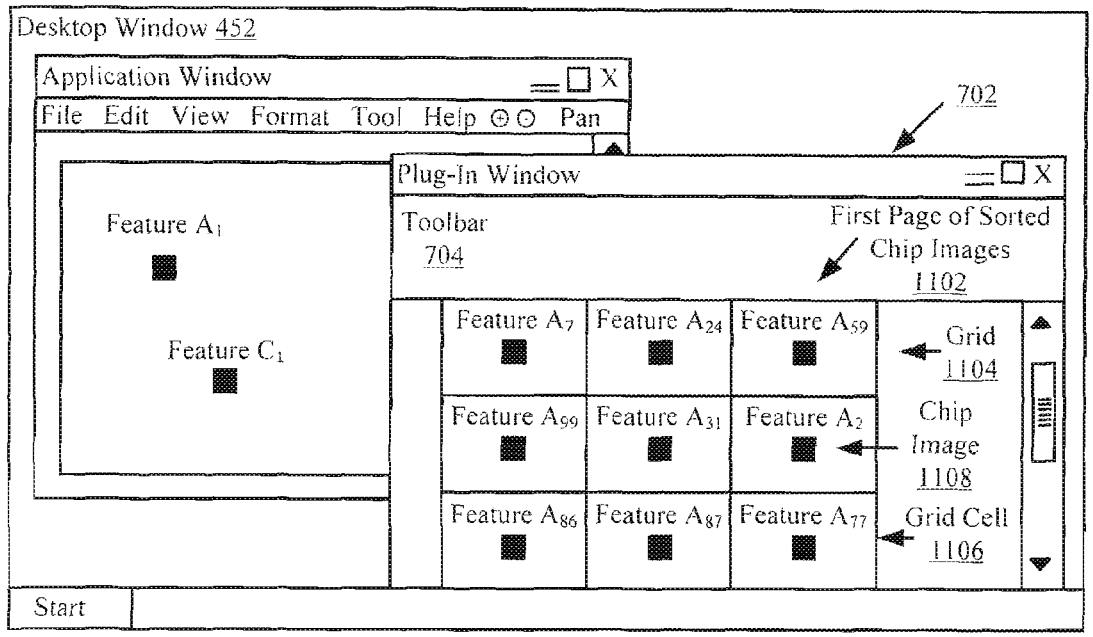
FIG. 11 is schematic illustration of an exemplary first page of sorted chip images that is useful for understanding the present invention.

Thereafter in step 1010, at least one screen page of sorted chip images is created by the feature analysis plug-in. The sorted chip images comprise "new features", "deleted features" and/or "matched features". The sorted chip images are arranged on the screen page in a pre-defined grid format or a matrix format. A first page of sorted chip images is then displayed in the plug-in window such that a user of the computing device can view a first set of chip images comprising "new features", "deleted features" and/or "matched features", as shown by step 1012. A schematic illustration of an exemplary first page of sorted chip images 1102 is provided in FIG. 11. As shown in FIG. 11, the first page of sorted chip images 1102 includes a grid 1104 defined by a plurality of grid cells 1106. Each of the grid cells 1106 comprises a chip image 1108.

Referring again to FIG. 10, the method 1000 continues with an optional step 1014. Optional step 1014 involves performing operations for marking or annotating at least one user-selected chip image of the first screen page with a mark or annotation indicating that a relevant change has occurred in relation to the object defined by the feature thereof. The operations of step 1014 include, but are not limited to: receiving by the computing device a user input for selecting one of the displayed chip images; and marking or annotating the user-selected chip image. The chip image can be selected by moving a mouse cursor over the chip image and clicking a mouse button. In response to the click of the mouse button, a menu is presented to the user of the computing device. The menu includes a list of commands, such as a command for enabling "flag/unflag" operations of the feature analysis plug-in.

Figure 12:
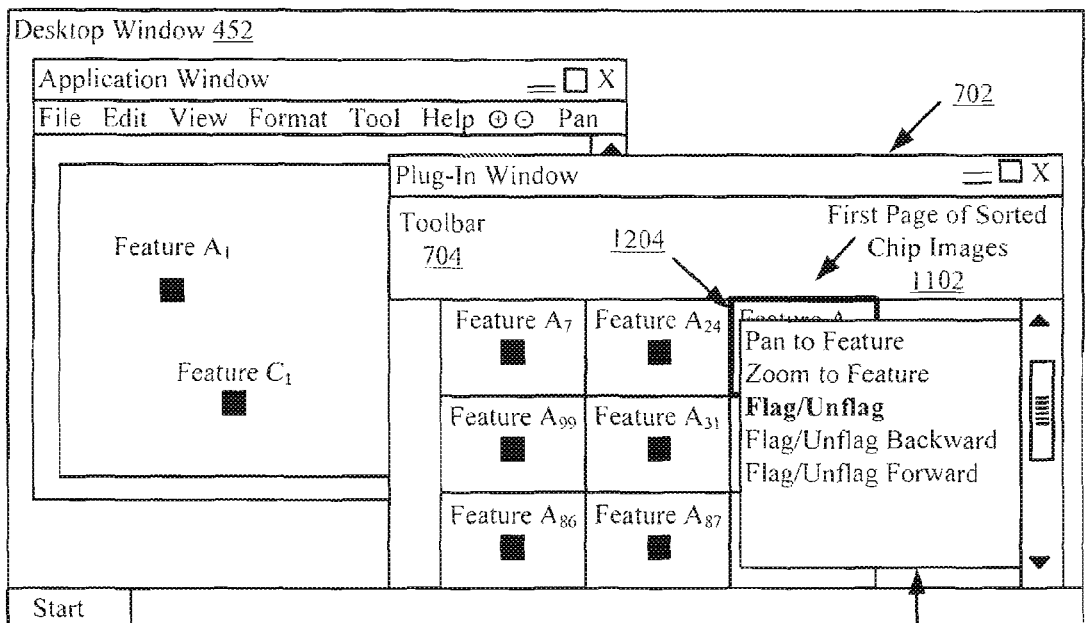
FIG. 12 is a schematic illustration of an exemplary selected chip image and exemplary menu that is useful for understanding the present invention.

A schematic illustration of an exemplary selected chip image 1204 and an exemplary menu 1206 is provided in FIG. 12. As shown in FIG. 12, the selected chip image 1204 is annotated with a relatively thick and distinctly colored border. Also, a selected command "Flag/Unflag" of the menu 1206 is annotated by bolding the text thereof. Embodiments of the present invention are not limited in this regard. Any type of mark or annotation can be used to illustrate that a particular chip image has been selected and/or that a particular command of a menu has been selected.

Figure 13:
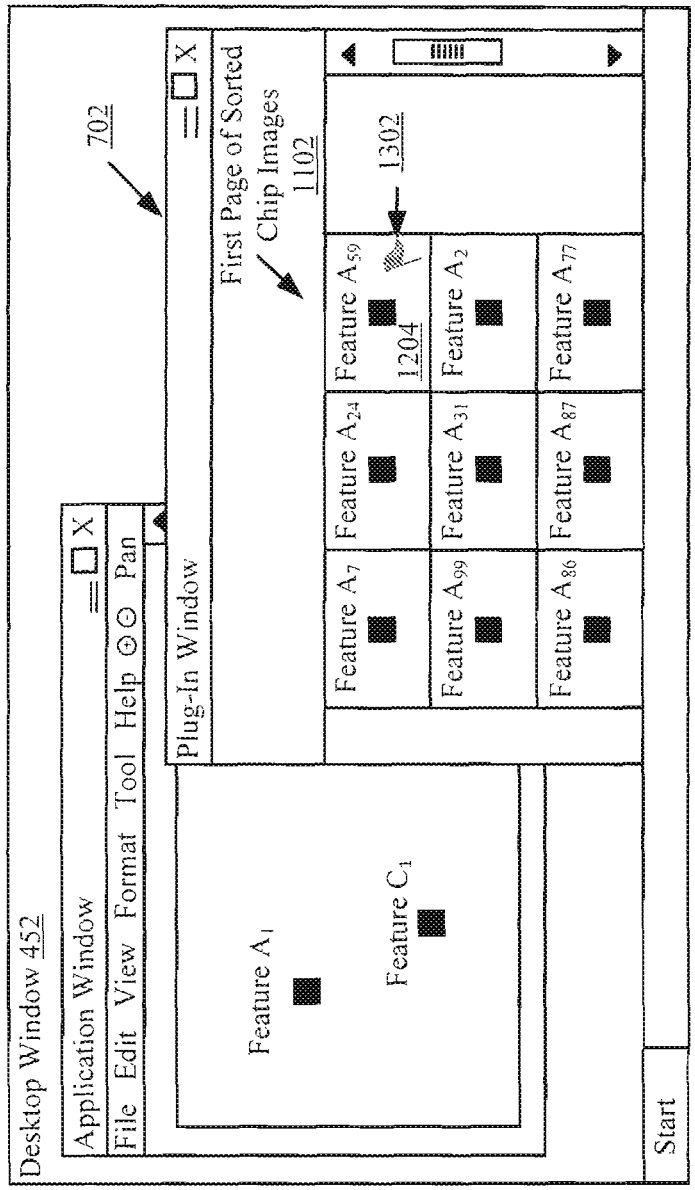
FIG. 13 is schematic illustration of an exemplary marked chip image that is useful for understanding the present invention.

A schematic illustration of a selected chip image 1204 marked with a mark 1302 is provided in FIG. 13. Embodiments of the present invention are not limited to the particularities of FIG. 13. Any type of mark or annotation can be employed to illustrate that a chip image illustrates a relevant change of the object defined by the feature thereof.

Referring again to FIG. 10, the method 1000 continues with an optional step 1016. In step 1016, the computing device receives a user input for viewing a second screen page comprising a second set of chip images containing "new features", "deleted features" and/or "matched features". In response to the user input, the second screen page is displayed in the plug-in window, as shown by optional step 1018. Thereafter, in optional step 1020, operations are performed for marking or annotating a feature of a user-selected chip image of the second screen page with a mark or annotation indicating that a relevant change has occurred in relation to the object defined by the feature thereof.

Upon completing step 1020, step 1022 is performed where all of the marked chip images are exported to a table or file. The exportation can be initiated by a user of the computing device using a GUI widget (e.g., GUI widget 816 or 818 of FIG. 8) of the plug-in window. Thereafter, step 1024 is performed where the method 1000 ends or other processing is performed.

Figure 14:
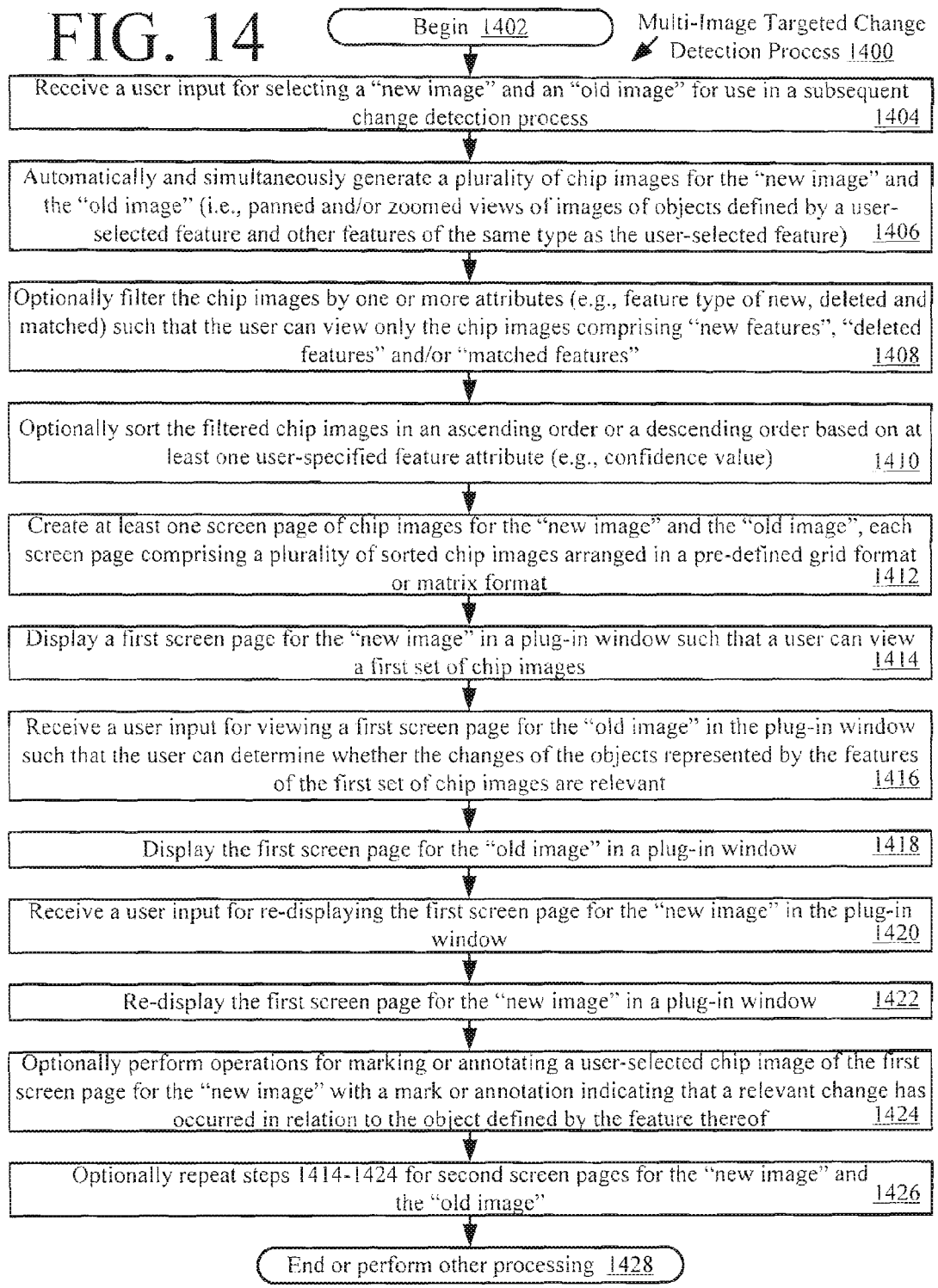
FIG. 14 is a flow diagram of an exemplary multi-image targeted change detection process that is useful for understanding the present invention.

Referring now to FIG. 14, there is provided a flow diagram of an exemplary multi-image targeted change detection process 1400 that is useful for understanding the present invention. As shown in FIG. 14, the process 1400 begins with step 1402 and continues with step 1404. In step 1404, a computing device (e.g., computing device 102 of FIG. 1) receives a user input for selecting a "new image" and an "old image" for use in a subsequent change detection process. The user input is facilitated by one or more GUI widgets (e.g., GUI widget 810 of FIG. 8) of a tool bar of the plug-in window. The GUI widget is configured to facilitate the selection of an image from a plurality of images. As such, the GUI widget 810 can include, but is not limited to, a text box and a drop down list populated with the names of images.

In a next step 1406, the feature analysis plug-in automatically generates a plurality of chip images for the "new image" and a plurality of chip images for the "old image". The chip images comprise panned and/or zoomed views of images of objects defined by a user-selected feature and other features of the same type as the user-selected feature.

Thereafter, an optional step 1408 is performed where the feature analysis plug-in performs filtering operations. The filtering operations involve filtering the chip images by one or more attributes (e.g., a feature type) such that a user can view only the chip images comprising "new features", "deleted features" and/or "matched features". The filtering operations can be performed in response to a user input. In this scenario, the user input is facilitated by a GUI widget (e.g., GUI widget 812 of FIG. 8). The GUI widget is provided to facilitate a selection of features for display in the display area (e.g., display area 706 of FIG. 7) of the plug-in window (e.g., plug-in window 702 of FIG. 7) based on their attributes (e.g., feature type). In this regard, the GUI widget includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["FEATURE TYPE"='matched']).

In a next optional step 1410, the feature analysis plug-in performs sorting operations. The sorting operations involve sorting the filtered chip images in an ascending order or a descending order based on at least one user-specified feature attribute (e.g., a confidence value). The sorting operations can be performed in response to a user input. In this scenario, the user input is facilitated by a GUI widget (e.g., GUI widget 814 of FIG. 8). The GUI widget is provided to facilitate the sorting of chip images based on one or more attributes of the features shown therein. For example, a plurality of chip images are sorted into an ascending order or a descending order based on the confidence values associated with the features shown therein. In this regard, the GUI widget includes a drop down list, a button and/or a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which an attribute can be selected from a plurality of attributes. The drop down box may also include widgets for specifying whether the chip images should be sorted in an ascending order or a descending order.

Upon completing optional step 1410, the process 1400 continues with step 1412. In step 1412, the feature analysis plug-in creates at least one screen page of chip images for the "new image" and at least one screen page of chip images for the "old image". Each screen page comprises a plurality of sorted chip images arranged in a pre-defined grid or matrix format. Subsequently, step 1414 is performed where a first screen page for the "new image" is presented in a plug-in window (e.g., plug-in window 702 of FIG. 7) such that the user can view a first set of chip images.

In a next step 1416, the computing device receives a user input for viewing a first screen page for the "old image" in the plug-in window such that the user can determine whether the changes of objects represented by the features of the first set of chip images are relevant. The user input is facilitated by a GUI widget (e.g., GUI widget 824 of FIG. 8) of the plug-in window. The GUI widget is provided to facilitate the cycling through chip image screen pages for a plurality of images. In this regard, the GUI widget is configured to allow manual cycling and/or automatic cycling between chip image screen pages for a plurality of images. As such, the GUI widget includes, but is not limited to, a check box for enabling and disabling image cycling operations of the feature analysis plug-in, a slider for setting the rate at which the images automatically cycle, and/or a button for manually commanding when to change the image.

In response to the user input of step 1416, step 1418 is performed where the first screen page for the "old image" is presented to the user via the plug-in window. After the user has analyzed the displayed screen page for the "old image", the user performs user-software interactions for re-displaying the first screen page for the "new image", as shown by step 1420. The user actions of step 1420 can be facilitated by a GUI widget (e.g., GUI widget 824 of FIG. 8) of the plug-in window.

In response to the user actions of step 1420, the feature analysis plug-in performs operations for re-displaying the first screen page for the "new image" in the plug-in window. After the first screen page for the "new image" has been re-displayed in the plug-in window, an optional step 1424 is performed. Optional step 1424 involves marking or annotating a user-selected chip image of the first screen page for the "new image" with a mark or annotation. The mark or annotation indicates that a relevant change as occurred in relation to the object defined by the feature of the user-selected chip image. Upon completing optional step 1424, the process 1400 continues with another optional step 1426. Step 1426 involves repeating steps 1414-1424 using second screen pages for the "new image" and the "old image". Thereafter, step 1428 is performed where the process 1400 ends or other processing is performed.

Figure 15:
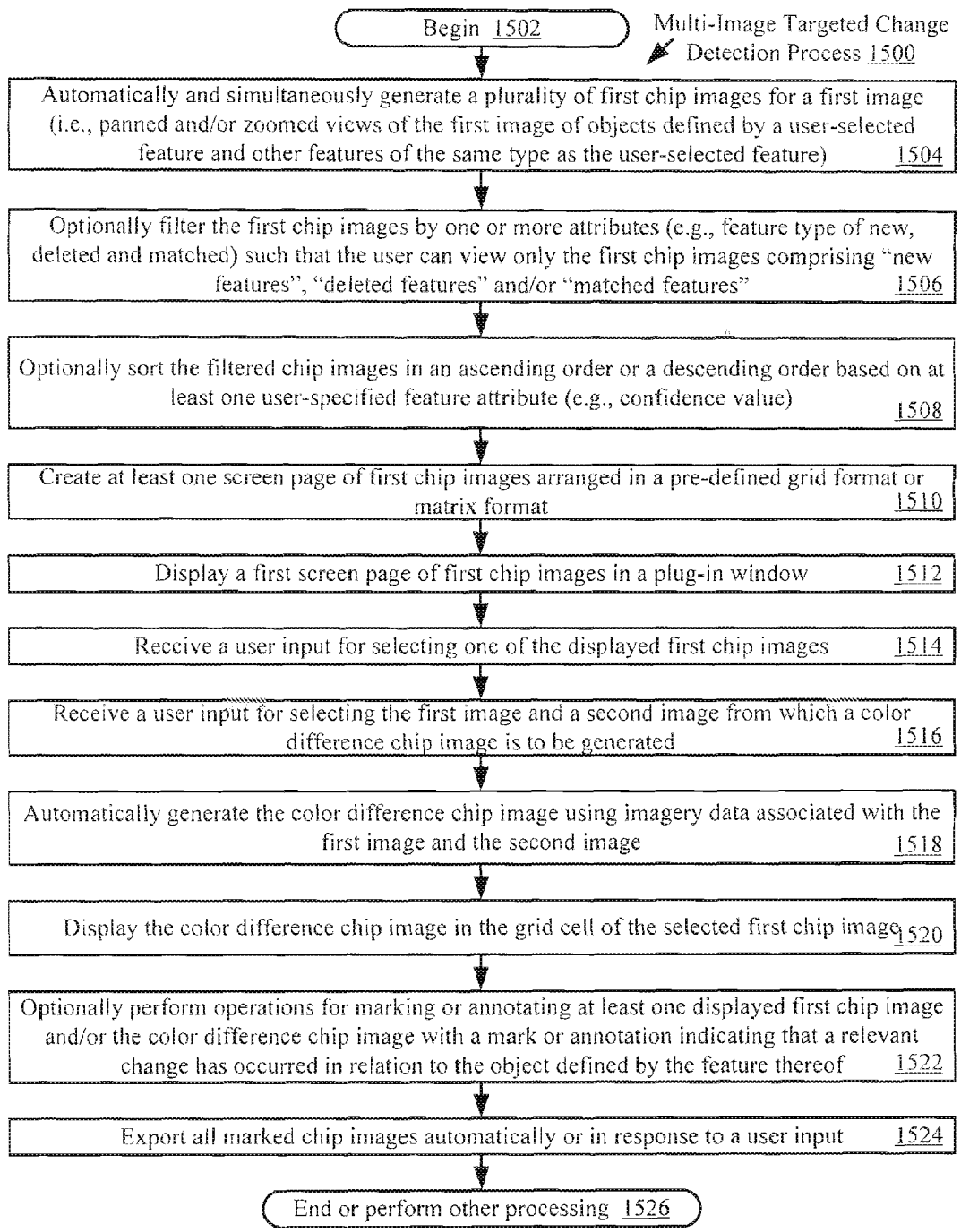
FIG. 15 is a flow diagram of an exemplary multi-image targeted change detection process that is useful for understanding the present invention.

Referring now to FIG. 15, there is provided a flow diagram of another exemplary multi-image targeted change detection process 1500 that is useful for understanding the present invention. As shown in FIG. 15, process 1500 begins with step 1502 and continues with step 1504. Step 1504 involves performing operations by a feature analysis plug-in to automatically and simultaneously generate a plurality of first chip images for a first image. The first chip images comprise panned and/or zoomed views of the first image of objects defined by a user-selected feature and other features of the same type as the user-selected feature.

After the first chip images have been generated, an optional step 1506 is performed where the feature analysis plug-in performs filtering operations. The filtering operations involve filtering the chip images by one or more attributes (e.g., a feature type) such that a user can view only the chip images comprising "new features", "deleted features" and/or "matched features". The filtering operations can be performed in response to a user input. In this scenario, the user input is facilitated by a GUI widget (e.g., GUI widget 812 of FIG. 8). The GUI widget is provided to facilitate a selection of features for display in the display area (e.g., display area 706 of FIG. 7) of the plug-in window (e.g., plug-in window 702 of FIG. 7) based on their attributes (e.g., feature type). In this regard, the GUI widget includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["FEATURE TYPE"='matched']).

In a next optional step 1508, the feature analysis plug-in performs sorting operations. The sorting operations involve sorting the filtered chip images in an ascending order or a descending order based on at least one user-specified feature attribute (e.g., a confidence value). The sorting operations can be performed in response to a user input. In this scenario, the user input is facilitated by a GUI widget (e.g., GUI widget 814 of FIG. 8). The GUI widget is provided to facilitate the sorting of chip images based on one or more attributes of the features shown therein. For example, a plurality of chip images are sorted into an ascending order or a descending order based on the confidence values associated with the features shown therein. In this regard, the GUI widget includes a drop down list, a button and/or a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which an attribute can be selected from a plurality of attributes. The drop down box may also include widgets for specifying whether the chip images should be sorted in an ascending order or a descending order.

Upon completing optional step 1508, the process 1500 continues with step 1510. In step 1510, the feature analysis plug-in creates at least one screen page of first chip images arranged in a pre-defined grid or matrix format. Subsequently, step 1512 is performed where a first screen page of first chip images is presented in a plug-in window (e.g., plug-in window 702 of FIG. 7).

Figure 16:
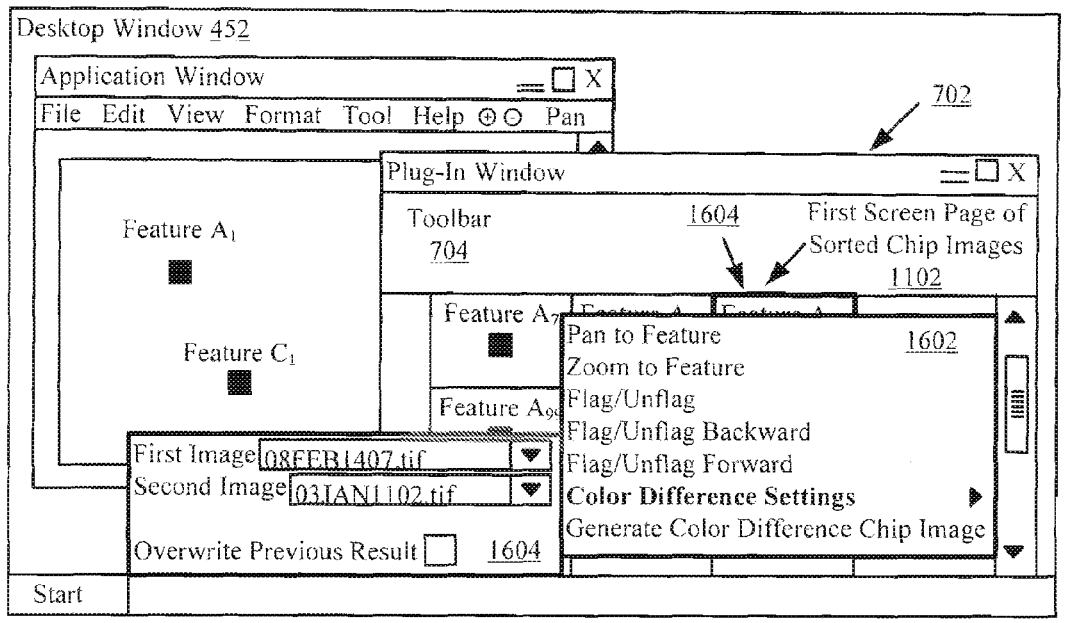
FIG. 16 is schematic illustration of an exemplary menu comprising a color difference settings command that is useful for understanding the present invention.

In a next step 1514, the computing device receives a user input for selecting one of the displayed first chip images. A schematic illustration of a selected chip image 1604 of a displayed screen page of sorted chip images 1102 is shown in FIG. 16. In some embodiments, the chip image is selected by moving a mouse cursor thereover and clicking a mouse button. As shown in FIG. 16, the selected chip image 1604 is surrounded by a rectangle. Embodiments of the present invention are not limited in this regard. Any type of mark or annotation can be used to illustrate that a particular feature of an image has been selected.

In response to the user-selection of a chip image, a GUI is presented for allowing the user to select the first image and a second image from which a difference color image is to be generated, as shown by step 1516. A schematic illustration of an exemplary GUI is provided in FIG. 16. As shown in FIG. 16, the GUI comprises a menu 1602 and a submenu 1604. The menu 1602 includes a plurality of commands which can be selected by a user. One of the commands of the menu 1602 is a "Color Difference Settings" command. Upon selection of the "Color Difference Settings" command, the submenu 1604 is presented to the user. The submenu 1604 includes combo boxes for selecting a first image and a second image from which a difference color image is to be generated. The submenu 1604 also includes a check box for overwriting previous results, i.e., for recalculating the color difference chip image.

Referring again to FIG. 15, the process 1500 continues with step 1518. In step 1518, the feature analysis plug-in performs operations to automatically generate the color difference chip image using data associated with the first image and the second image. The color difference chip image is a visual representation of the difference between corresponding portions of the first image and the second image. The color difference chip image is generated by: applying pixel intensities to the green spectrum of an RGB signal for the second image; applying pixel intensities to the blue and red spectrums of an RGB signal for the first image; combining the two "colored" images to obtain a color difference image; and generating a color difference chip image using the color difference image.

Figure 17:
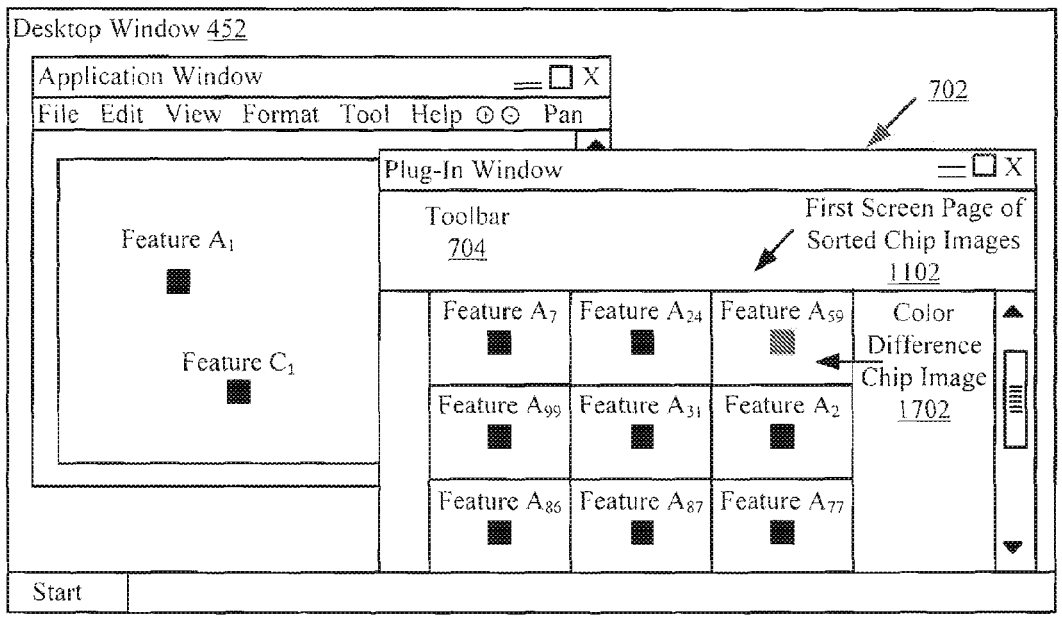
FIG. 17 is a schematic illustration of an exemplary color difference chip image that is useful for understanding the present invention.

A schematic illustration of an exemplary color difference chip image 1702 is provided in FIG. 17. As shown in FIG. 17, the feature $A_{59}$ of the color difference chip image 1702 is a different color than the feature A59 of the first image. Although not evident from FIG. 17, the feature $A_{59}$ of the color difference chip image 1702 appears blue-red or purple indicating that the feature is present in the first image and absent from the second image. As a consequence of the purple coloring of the feature $A_{59}$, a user can quickly determine whether the change of the object represented by the first image is a relevant change.

Referring again to FIG. 15, the process 1500 continues with step 1520 where the color difference chip image is displayed in the grid cell of the selected chip image of the first screen page. A schematic illustration of an exemplary color difference chip image 1702 displayed in the grid cell of the selected chip image is provided in FIG. 17.

In a next optional step 1522, the computing device optionally performs operations for marking or annotating a displayed first chip image and/or the displayed color difference chip image with a mark or annotation. The mark or annotation indicates that a relevant change has occurred in relation to the object defined by the feature thereof. The operations of step 1522 include, but are not limited to: receiving by the computing device a user input for selecting one of the displayed chip images; and marking or annotating the user-selected chip image. The chip image can be selected by moving a mouse cursor over the chip image and clicking a mouse button. In response to the click of the mouse button, a menu is presented to the user of the computing device. The menu includes a list of commands, such as a command for enabling "flag/unflag" operations of the feature analysis plug-in.

Figure 18:
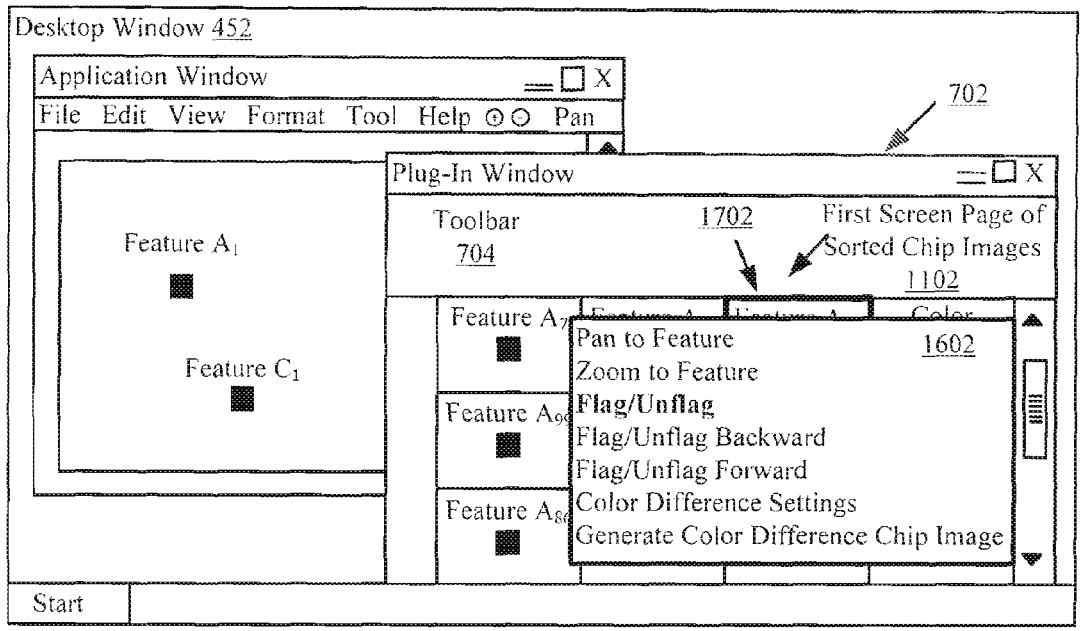
FIG. 18 is a schematic illustration of an exemplary menu with a flag/unflag chip image command that is useful for understanding the present invention.

A schematic illustration of an exemplary selected color difference chip image 1702 and an exemplary menu 1602 is provided in FIG. 18. As shown in FIG. 18, the selected chip image 1702 is annotated with a relatively thick and distinctly colored border. Also, a selected command "Flag/Unflag" of the menu 1602 is annotated by bolding the text thereof. Embodiments of the present invention are not limited in this regard. Any type of mark or annotation can be used to illustrate that a particular chip image has been selected and/or that a particular command of a menu has been selected.

Figure 19:
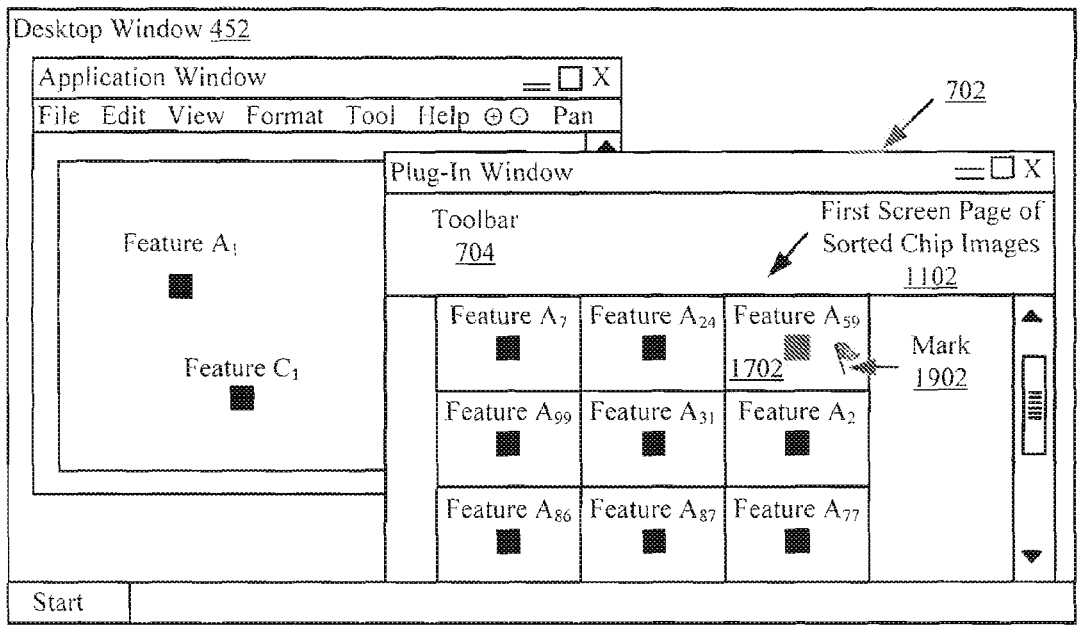
FIG. 19 is a schematic illustration of an exemplary marked color difference chip image that is useful for understanding the present invention.

A schematic illustration of a selected color difference chip image 1702 marked with a mark 1902 is provided in FIG. 19. Embodiments of the present invention are not limited to the particularities of FIG. 19. Any type of mark or annotation can be employed to illustrate that a chip image illustrates a relevant change of the object defined by the feature thereof.

Referring again to FIG. 15, the process 1500 continues with step 1524 where the marked chip images are then exported to a table or file. The exportation can be initiated by a user of the computing device using a GUI widget (e.g., GUI widget 816 or 818 of FIG. 8) of the plug-in window. Thereafter, step 1526 is performed where the process 1500 ends or other processing is performed.

Figure 20:
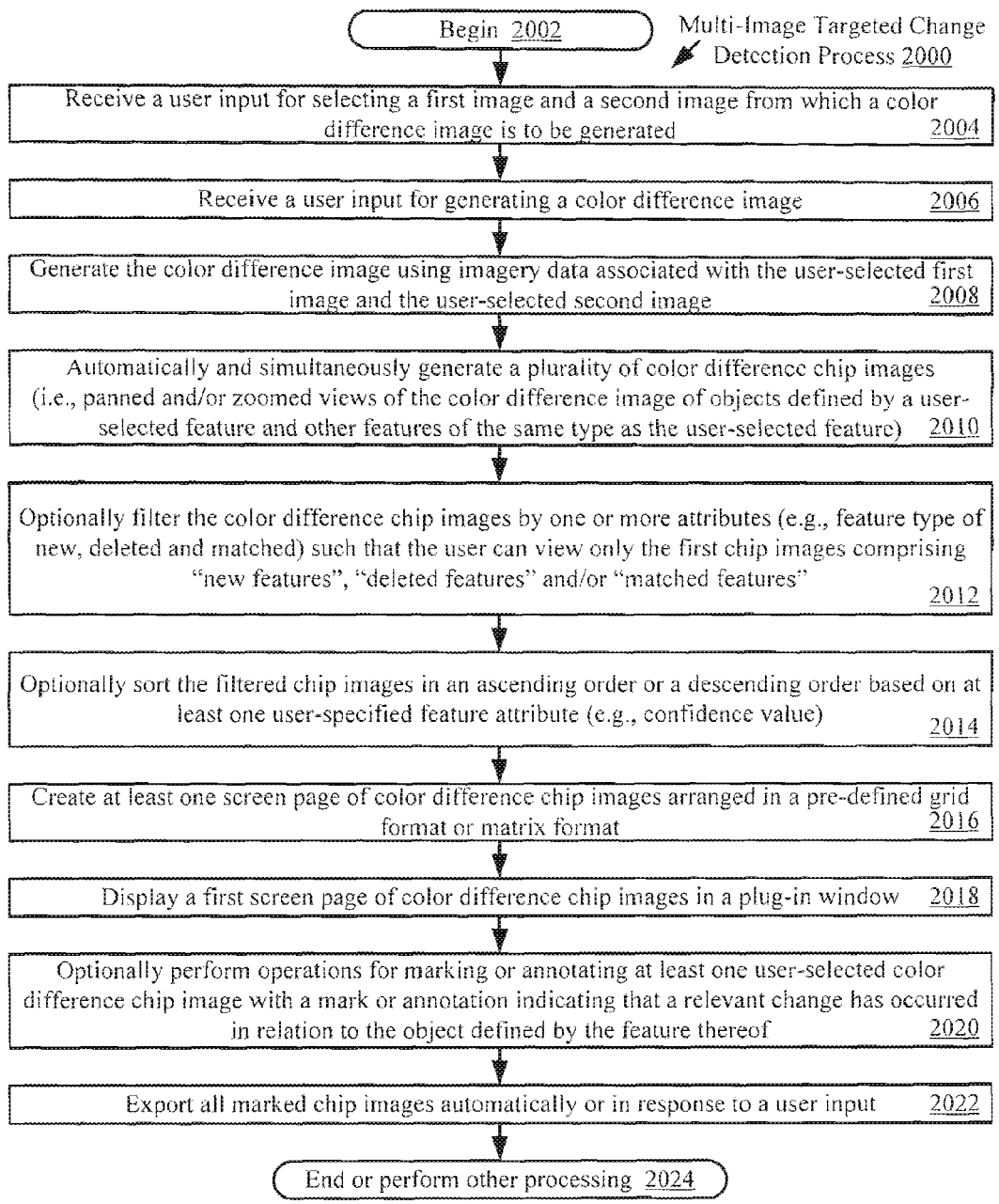
FIG. 20 is a flow diagram of an exemplary multi-image targeted change detection process that is useful for understanding the present invention.
Figure 21:
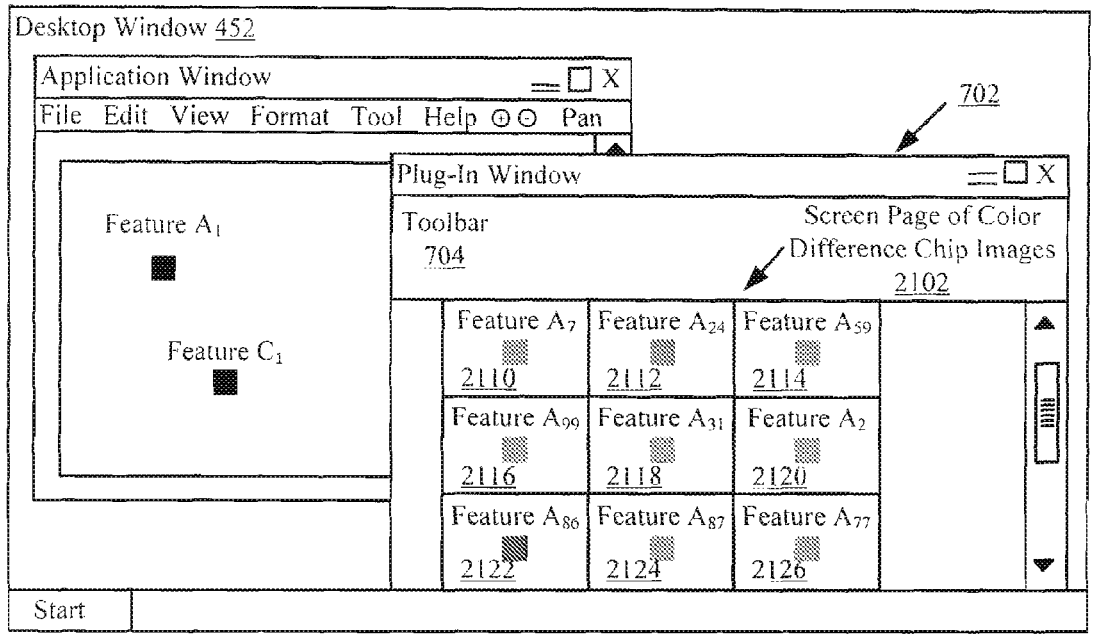
FIG. 21 is a schematic illustration of an exemplary screen page of color difference chip images that is useful for understanding the present invention.

Referring now to FIG. 20, there is provided a flow diagram of another exemplary multi-image targeted changed detection process 2000. As shown in FIG. 20, the process 2000 begins with step 2002 and continues with step 2004. In step 2004, a computing device (e.g., computing device 102 of FIG. 1) receives a user input for selecting a first image and a second image from which a color difference image is to be generated. In a next step 2006, the computing device receives a user input for generating a color difference image. The user input is facilitated by a GUI widget (e.g., GUI widget 830 of FIG. 8) of the plug-in window. The GUI widget is provided to facilitate a user request for color differencing in increments. In this regard, the GUI widget includes, but is not limited to, a button for enabling/disabling a color differencing function of the feature analysis plug-in and an arrow button for accessing a submenu. The submenu includes GUI widgets for selecting a first image and a second image from which a color difference image is to be generated. These submenu GUI widgets can include, but are not limited to, text boxes and drop down menus.

In response to the user inputs of steps 2004 and 2006, a feature analysis plug-in performs operations to automatically generate a color difference image using imagery data associated with the user-selected first image and the user-selected second image, as shown by step 2008. In a next step 2010, a plurality of color difference chip images are automatically and simultaneously generated by the computing device. The color difference chip images comprise panned and/or zoomed views of the color difference image of objects defined by a user-selected feature and other features of the same type as the user-selected feature.

After the color difference chip images have been generated, an optional step 2012 is performed where the feature analysis plug-in performs filtering operations. The filtering operations involve filtering the color difference chip images by one or more attributes (e.g., a feature type) such that a user can view only the chip images comprising "new features", "deleted features" and/or "matched features". The filtering operations can be performed in response to a user input. In this scenario, the user input is facilitated by a GUI widget (e.g., GUI widget 812 of FIG. 8). The GUI widget is provided to facilitate a selection of features for display in the display area (e.g., display area 706 of FIG. 7) of the plug-in window (e.g., plug-in window 702 of FIG. 7) based on their attributes (e.g., feature type). In this regard, the GUI widget includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["FEATURE TYPE"='matched']).

In a next optional step 2014, the feature analysis plug-in performs sorting operations. The sorting operations involve sorting the filtered chip images in an ascending order or a descending order based on at least one user-specified feature attribute (e.g., a confidence value). The sorting operations can be performed in response to a user input. In this scenario, the user input is facilitated by a GUI widget (e.g., GUI widget 814 of FIG. 8). The GUI widget is provided to facilitate the sorting of chip images based on one or more attributes of the features shown therein. For example, a plurality of chip images are sorted into an ascending or descending order based on the confidence values associated with the features shown therein. In this regard, the GUI widget includes a drop down list, a button and/or a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which an attribute can be selected from a plurality of attributes. The drop down box may also include widgets for specifying whether the chip images should be sorted in an ascending order or a descending order.

Upon completing optional step 2014, the process 2000 continues with step 2016. In step 2016, the feature analysis plug-in creates at least one screen page of color difference chip images arranged in a pre-defined grid or matrix format. Subsequently, step 2018 is performed where a first screen page of color difference chip images is presented in a plug-in window (e.g., plug-in window 702 of FIG. 7). A schematic illustration of an exemplary screen page of color difference chip images 2102 is provided in FIG. 21. Although not evident from the grey scale FIG. 21, it should be understood that features $A_7, A_{59}, A_{99}, A_{31}, A_2, A_{87}$ and $A_{77}$ of color difference chip image 2110, 2114, 2116-2120, 2114 and 2126 appear grey. Feature $A_{24}$ of color difference chip image 2112 appears green. Feature $A_{86}$ of color difference chip image 2122 appears blue-red or purple. As noted above, "grey colored" features of a color difference image occur when the pixel intensities of the corresponding pixels of the first and second images are the same. In contrast, "green colored" features of the color difference image occur when the feature is present in the second image and absent from the first image. "Blue-red or purple colored" features of the color difference image occur when the feature is present in the first image and absent from the second image. As a consequence of the grey, green or purple coloring of the features, a user can quickly determine whether the change of the object represented by the first image is a relevant change.

Referring again to FIG. 20, the process 2000 continues with step 2020 where the computing device optionally performs operations for marking or annotating one or more user-selected color difference chip images with a mark or annotation. The mark or annotation indicates that a relevant change has occurred in relation to the object defined by the feature thereof. The operations of step 2020 include, but are not limited to: receiving by the computing device a user input for selecting one of the displayed chip images; and marking or annotating the user-selected chip image. The chip image can be selected by moving a mouse cursor over the chip image and clicking a mouse button. In response to the click of the mouse button, a menu is presented to the user of the computing device. The menu includes a list of commands, such as a command for enabling "flag/unflag" operations of the feature analysis plug-in.

Figure 22:
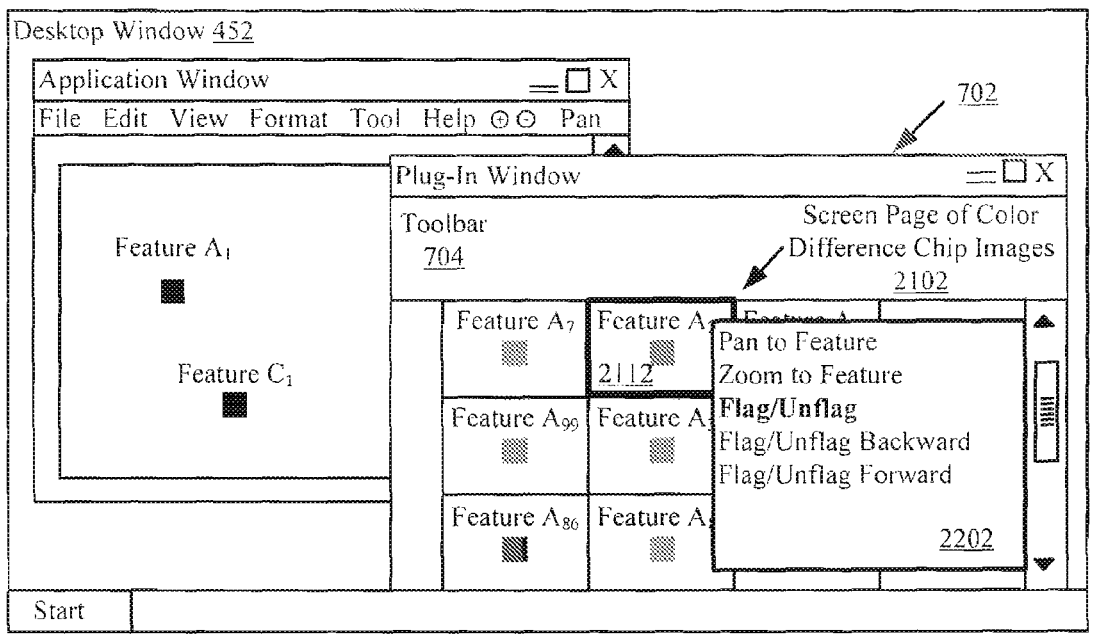
FIG. 22 is a schematic illustration of an exemplary selected color difference chip image that is useful for understanding the present invention.

A schematic illustration of an exemplary selected color difference chip image 2112 and an exemplary menu 2202 is provided in FIG. 22. As shown in FIG. 22, the selected chip image 2112 is annotated with a relatively thick and distinctly colored border. Also, a selected command "Flag/Unflag" of the menu 2202 is annotated by bolding the text thereof. Embodiments of the present invention are not limited in this regard. Any type of mark or annotation can be used to illustrate that a particular chip image has been selected and/or that a particular command of a menu has been selected.

Figure 23:
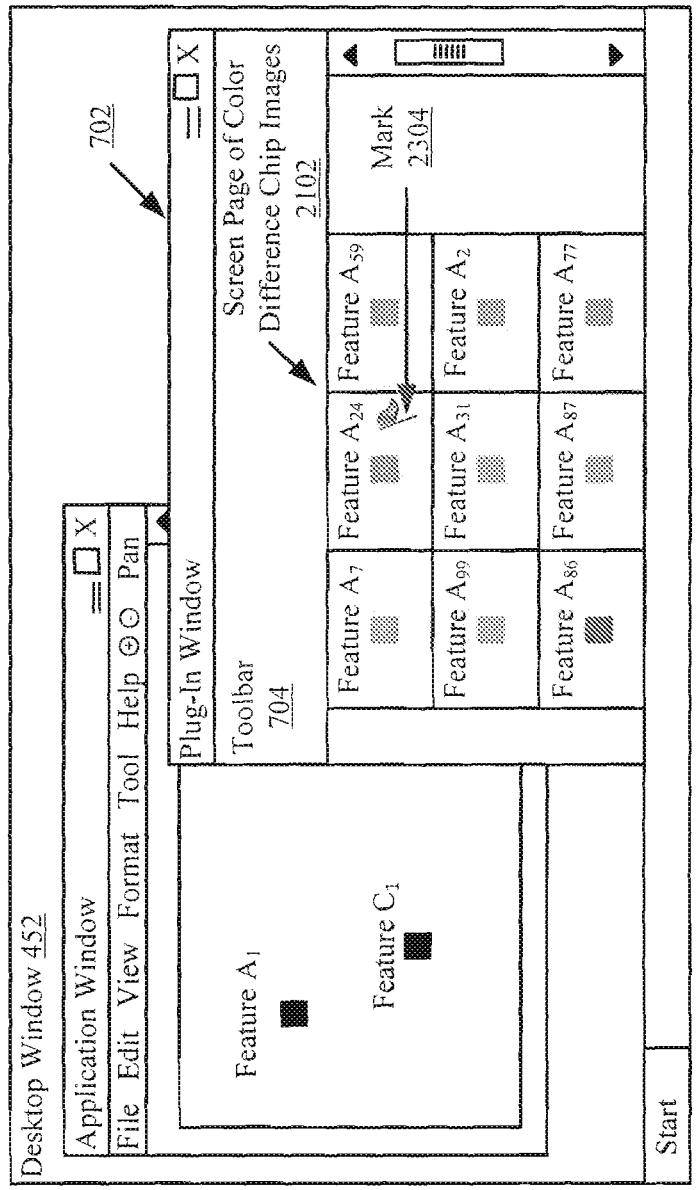
FIG. 23 is a schematic illustration of an exemplary marked color difference chip image that is useful for understanding the present invention.

A schematic illustration of a selected color difference chip image 2112 marked with a mark 2304 is provided in FIG. 23. Embodiments of the present invention are not limited to the particularities of FIG. 23. Any type of mark or annotation can be employed to illustrate that a chip image illustrates a relevant change of the object defined by the feature thereof.

Referring again to FIG. 20, the process 2000 continues with step 2022 where the marked chip images are then exported to a table or file. The exportation can be initiated by a user of the computing device using a GUI widget (e.g., GUI widget 816 or 818 of FIG. 8) of the plug-in window. Thereafter, step 2024 is performed where the process 2000 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficiently and accurately detecting changes in feature data, comprising:
    determining, by at least one electronic circuit, first vectors for first features extracted from a first image;
    comparing, by the electronic circuit, the first vectors with pre-defined second vectors;
    classifying, by the electronic circuit, the first features into a plurality of classes based on the results of the comparing step; and
    analyzing a plurality of chip images to determine if any one of the first features of at least one of the plurality of classes indicates that a relevant change has occurred in relation to an object represented thereby, said chip images comprising panned and/or zoomed views of said first image of objects.

2. The method according to claim 1, wherein the first vectors are determined by converting locations of pixels defining the first features to coordinates of a multi-dimensional space.

3. The method according to claim 1, wherein the first vectors and the second vectors are compared with each other to determine mathematically which of the first features overlap one or more of second features.

4. The method according to claim 3, wherein the first features which overlap the second features are classified as "matched features".

5. The method according to claim 3, wherein the first features which do not overlap any of the second features are classified as "new features".

6. The method according to claim 3, wherein the second features which do not have any overlapping first features are classified as "deleted features".

7. The method according to claim 1, further comprising determining, by the electronic circuit, a plurality of confidence values indicating a degree of similarity, difference or overlap between the first features and pre-defined second features.

8. A method for efficiently and accurately detecting changes in feature data, comprising:
    determining, by at least one electronic circuit, first vectors for first features extracted from a first image;
    comparing, by the electronic circuit, the first vectors with pre-defined second vectors;
    classifying, by the electronic circuit, the first features into a plurality of classes based on the results of the comparing step; and
    analyzing the first image to determine if an one of the first features of at least one of the plurality of classes indicates that a relevant change has occurred in the relation to an object represented thereby;
    wherein the analyzing step comprises:
        automatically and simultaneously generating a plurality of chip images for the first image, the chip images comprising panned and/or zoomed views of the first image of objects defined by a user-selected feature and other features of the same feature class as the user-selected feature; and
        analyzing the plurality of chip images to determine if any one of the first features indicates that a relevant change has occurred in relation to the object represented thereby.

9. The method according to claim 1, wherein the analyzing step comprises comparing the contents of the first image with the contents of a second image to determine if any one of the first features indicates that a relevant change has occurred in relation to the object represented thereby.

10. The method according to claim 1, further comprising:
generating at least one color difference image using imagery data for the first image and imagery data for a second image; and
analyzing the color difference image to determine if any one of the features thereof indicates that a relevant change has occurred in relation to the object represented thereby.

11. A system, comprising:
at least one electronic circuit configured to
determine first vectors for first features extracted from a first image,
compare the first vectors with pre-defined second vectors,
classify the first features into a plurality of classes based on the results of the comparing step, and
analyze a plurality of chip images to determine if any one of the first features of at least one of the plurality of classes indicates that a relevant change has occurred in relation to an object represented thereby, said chip images comprising panned and/or zoomed views of said first image of objects.

12. The system according to claim 11, wherein the first vectors are determined by converting locations of pixels defining the first features to coordinates of a multi-dimensional space.

13. The system according to claim 11, wherein the first vectors and the second vectors are compared with each other to determine mathematically which of the first features overlap one or more second features defined by previously stored data.

14. The system according to claim 13, wherein the first features which overlap the second features are classified as "matched features".

15. The system according to claim 13, wherein the first features which do not overlap any of the second features are classified as "new features".

16. The system according to claim 13, wherein the second features which do not have any overlapping first features are classified as "deleted features".

17. The system according to claim 11, wherein the electronic circuit is further configured to determine a plurality of confidence values indicating a degree of similarity, difference or overlap between the first features and second features defined by previously stored data.

18. A system, comprising:
at least one electronic circuit configured to
determine first vectors for first features extracted from a first image,
compare the first vectors with pre-defined second vectors,
classify the first features into a plurality of classes based on the results of the comparing step, and
analyze the first image to determine if any one of the first features of at least one of the plurality of classes indicates that a relevant change has occurred in relation to an object represented thereby:
wherein the electronic circuit is further configured to
automatically and simultaneously generate a plurality of chip images for the first image, the chip images comprising panned and/or zoomed views of the first image of objects defined by a user-selected feature and other features of the same feature class as the user-selected feature, and
facilitate a user analysis of the plurality of chip images to identify at least one first feature which indicates that a relevant change has occurred in relation to the object represented thereby.

19. The system according to claim 11, wherein the electronic circuit is further configured to facilitate a user comparison of the contents of the first image with the contents of a second image to identify at least one first feature which indicates that a relevant change has occurred in relation to the object represented thereby.

20. The system according to claim 11, wherein the electronic circuit is further configured to
generate at least one color difference image using imagery data for the first image and imagery data for a second image, and
facilitate a user analysis of the color difference image to identify at least one feature thereof which indicates that a relevant change has occurred in relation to the object represented thereby.

* * * * *